(12) United States Patent
Starsinic et al.

(10) Patent No.: US 10,536,919 B2
(45) Date of Patent: Jan. 14, 2020

(54) METHOD AND APPARATUS FOR PROCESSING SERVICE LAYER DETACH COMMANDS AND ATTACH NOTIFICATIONS

(71) Applicant: IOT HOLDINGS, INC., Wilmington, DE (US)

(72) Inventors: Michael F. Starsinic, Newtown, PA (US); Behrouz Aghili, Commack, NY (US); Suresh Palanisamy, Namakkal District (IN); Guang Lu, Thornhill (CA)

(73) Assignee: IOT Holdings, Inc., Wilmington, DE (US)

( * ) Notice: Subject to any disclaimer, the term of this patent is extended or adjusted under 35 U.S.C. 154(b) by 144 days.

(21) Appl. No.: 14/758,801

(22) PCT Filed: Dec. 23, 2013

(86) PCT No.: PCT/US2013/077617
§ 371 (c)(1),
(2) Date: Jun. 30, 2015

(87) PCT Pub. No.: WO2014/107381
PCT Pub. Date: Jul. 10, 2014

(65) Prior Publication Data
US 2015/0341889 A1 Nov. 26, 2015

Related U.S. Application Data

(60) Provisional application No. 61/748,908, filed on Jan. 4, 2013.

(51) Int. Cl.
*H04L 29/06* (2006.01)
*H04W 60/06* (2009.01)
(Continued)

(52) U.S. Cl.
CPC ............. *H04W 60/06* (2013.01); *H04W 4/70* (2018.02); *H04W 12/06* (2013.01); *H04W 88/08* (2013.01)

(58) Field of Classification Search
CPC ..... H04W 76/02; H04W 80/10; H04W 12/06; H04W 80/04; H04W 8/02; H04W 8/18;
(Continued)

(56) References Cited

U.S. PATENT DOCUMENTS 7,606,227 B2 * 10/2009 Fukushima ........... H04L 12/184
370/351
8,332,525 B2 * 12/2012 Lynch ................... H04W 8/186
379/201.01
(Continued)

FOREIGN PATENT DOCUMENTS

CN 102056266 A 5/2011
CN 102202270 A 9/2011
(Continued)

OTHER PUBLICATIONS

3rd Generation Partnership Project (3GPP), S2-121339, "Clarifications on Device Triggering", ZTE, SA WG2 Meeting #90, Bratislava ,Slovakia, Apr. 16-20, 2012, 8 pages.
(Continued)

*Primary Examiner* — Sai Aung
(74) *Attorney, Agent, or Firm* — Volpe and Koenig, P.C.

(57) ABSTRACT

A method and apparatus are described for processing service layer detach commands and attach notifications. A services capability server (SCS) may request a core network to perform a network initiated detach of a device. This procedure may be used when the SCS knows that the device will not be needed for a long time or when the SCS detects some event that may warrant a detach, (e.g., theft, disallowed location, integrity validation failure). The SCS may be asked
(Continued)

if the device may be allowed to attach at this time. If the SCS indicates that the attach may be rejected, the device may not be allowed to attach until a later time, thus avoiding additional activity on control and user planes. The SCS may be informed when a device is attached based on various subscription fields stored in a home subscriber server (HSS).

7 Claims, 21 Drawing Sheets

(51) Int. Cl.
    *H04W 12/06* (2009.01)
    *H04W 4/70* (2018.01)
    *H04W 88/08* (2009.01)
(58) Field of Classification Search
    CPC ............. H04W 92/02; H04W 36/0022; H04W 36/0066; H04W 48/18; H04W 4/00; H04W 76/00
    See application file for complete search history.

(56) References Cited

U.S. PATENT DOCUMENTS

| | | | |
|---|---|---|---|
| 8,521,170 B2* | 8/2013 | Buckley | H04Q 3/0045 455/445 |
| 9,154,641 B2* | 10/2015 | Shaw | H04W 4/029 |
| 2006/0034208 A1* | 2/2006 | Blouin | H04L 1/1887 370/328 |
| 2010/0057485 A1 | 3/2010 | Luft | |
| 2011/0199905 A1* | 8/2011 | Pinheiro | H04W 4/005 370/235 |
| 2012/0252518 A1 | 10/2012 | Karampatsis et al. | |
| 2013/0329653 A1* | 12/2013 | Russell, Jr. | H04W 8/20 370/329 |

FOREIGN PATENT DOCUMENTS

| | | |
|---|---|---|
| CN | 102448042 A | 5/2012 |
| CN | 102625276 A | 8/2012 |
| EP | 2822305 A1 | 1/2015 |
| WO | WO 2011/161541 A2 | 12/2011 |

OTHER PUBLICATIONS

3rd Generation Partnership Project (3GPP), S2-123544, "Report MTC Monitoring Event via MTC-IWF", ZTE, LG Electronics, SA WG2 Meeting #93, Sofia, Bulgaria, Oct. 8-12, 2012, pp. 1-8.
3rd Generation Partnership Project (3GPP), S2-124365, "Multiple Group Message Delivery Mechanisms", Qualcomm Incorporated, SA WG2 Meeting #94, New Orleans, USA, Nov. 12-16, 2012, pp. 1-8.
3rd Generation Partnership Project (3GPP), SP-100863, "Update to Network Improvements for Machine Type Communication", SA WG2, TSG SA Meeting #50, Istambul, Turkey, Dec. 13-15, 2010, pp. 1-4.
3rd Generation Partnership Project (3GPP), SP-110877, "Revised WID: Stage-2 Aspects of System Improvements for Machine Type Communication (SIMTC)", SA WG2, TSG SA Meeting #54, Berlin, Germany, Dec. 12-14, 2011, 7 pages.
3rd Generation Partnership Project (3GPP), TR 21.905 V11.3.0, "Technical Specification Group Services and System Aspects, Vocabulary for 3GPP Specifications (Release 11)", Dec. 2012, 64 pages.
3rd Generation Partnership Project (3GPP), TR 23.887 V0.6.0, "Technical Specification Group Services and System Aspects, Machine-Type and Other Mobile Data Applications Communications Enhancements (Release 12)", Dec. 2012, pp. 1-95.
3rd Generation Partnership Project (3GPP), TS 22.011 V11.2.0, "Technical Specification Group Services and System Aspects, Service Accessibility (Release 11)", Dec. 2011, 26 pages.
3rd Generation Partnership Project (3GPP), TS 22.368 V12.1.0, "Technical Specification Group Services and System Aspects, Service Requirements for Machine-Type Communications (MTC), Stage 1 (Release 12)", Dec. 2012, 24 pages.
3rd Generation Partnership Project (3GPP), TS 23.003 V11.4.0, "Technical Specification Group Core Network and Terminals, Numbering, Addressing and Identification (Release 11)", Dec. 2012, 83 pages.
3rd Generation Partnership Project (3GPP), TS 23.008 V11.6.0, "Technical Specification Group Core Network and Terminals, Organization of Subscriber Data (Release 11)", Dec. 2012, 109 pages.
3rd Generation Partnership Project (3GPP), TS 23.038 V11.0.0, "Technical Specification Group Core Network and Terminals, Alphabets and Language-Specific Information (Release 11)", Sep. 2012, 56 pages.
3rd Generation Partnership Project (3GPP), TR 23.039 V5.0.0, "Technical Specification Group Terminals, Interface Protocols for the Connection of Short Message Service Centres (SMSCs) to Short Message Entities (SMEs) (Release 5)", Jun. 2002, 7 pages.
3rd Generation Partnership Project (3GPP), TS 23.040 V11.4.0, "Technical Specification Group Core Network and Terminals, Technical Realization of the Short Message Service (SMS) (Release 11)", Dec. 2012, 206 pages.
3rd Generation Partnership Project (3GPP), TS 23.060 V11.4.0, "Technical Specification Group Services and System Aspects, General Packet Radio Service (GPRS), Service Description, Stage 2 (Release 11)", Dec. 2012, 335 pages.
3rd Generation Partnership Project (3GPP), TS 23.401 V11.4.0, "Technical Specification Group Services and System Aspects, General Packet Radio Service (GPRS) Enhancements for Evolved Universal Terrestrial Radio Access Network (E-UTRAN) Access (Release 11)", Dec. 2012, 284 pages.
3rd Generation Partnership Project (3GPP), TS 23.682 V11.1.0, "Technical Specification Group Services and System Aspects, Architecture Enhancements to Facilitate Communications with Packet Data Networks and Applications (Release 11)", Jun. 2012, 27 pages.
3rd Generation Partnership Project (3GPP), TS 23.682 V11.3.0, "Technical Specification Group Services and System Aspects, Architecture Enhancements to Facilitate Communications with Packet Data Networks and Applications (Release 11)", Dec. 2012, pp. 1-29.
3rd Generation Partnership Project (3GPP), TS 24.007 V11.0.0, "Technical Specification Group Core Network and Terminals, Mobile Radio Interface Signalling Layer 3, General Aspects (Release 11)", Jun. 2012, 149 pages.
3rd Generation Partnership Project (3GPP), TS 24.008 V12.0.0, "Technical Specification Group Core Network and Terminals, Mobile Radio Interface Layer 3 Specification, Core Network Protocols, Stage 3 (Release 12)", Dec. 2012, 678 pages.
3rd Generation Partnership Project (3GPP), TS 24.011 V11.1.0, "Technical Specification Group Core Network and Terminals, Point-to-Point (PP) Short Message Service (SMS) Support on Mobile Radio Interface (Release 11)", Sep. 2012, 127 pages.
3rd Generation Partnership Project (3GPP), TS 24.090 V11.0.0, "Technical Specification Group Core Network and Terminals, Unstructured Supplementary Service Data (USSD), Stage 3 (Release 11)", Sep. 2012, 13 pages.
3rd Generation Partnership Project (3GPP), TS 24.301 V11.5.0, "Technical Specification Group Core Network and Terminals, Non-Access-Stratum (NAS) Protocol for Evolved Packet System (EPS), Stage 3 (Release 11)", Dec. 2012, 344 pages.
3rd Generation Partnership Project (3GPP), TS 29.002 V11.5.0, "Technical Specification Group Core Network and Terminals, Mobile Application Part (MAP) Specification (Release 11)", Dec. 2012, 1013 pages.
3rd Generation Partnership Project (3GPP), TS 29.272 V11.5.0, "Technical Specification Group Core Network and Terminals, Evolved Packet System (EPS), Mobility Management Entity (MME) and Serving GPRS Support Node (SGSN) Related Interfaces Based on Diameter Protocol (Release 11)", Dec. 2012, 119 pages.
3rd Generation Partnership Project (3GPP), TS 29.329 V11.5.0, "Technical Specification Group Core Network and Terminals, Sh Interface Based on the Diameter Protocol, Protocol Details (Release 11)", Dec. 2012, 22 pages.

(56) References Cited

OTHER PUBLICATIONS

3rd Generation Partnership Project (3GPP), TS 29.336 V1.0.0, "Technical Specification Group Core Network and Terminals, Home Subscriber Server (HSS) Diameter Interfaces for Interworking with Packet Data Networks and Applications (Release 11)", Sep. 2012, 20 pages.
3rd Generation Partnership Project (3GPP), TS 29.337 V1.0.0, "Technical Specification Group Core Network and Terminals, Diameter-Based T4 Interface for Communications with Packet Data Networks and Applications (Release 11)", Sep. 2012, 18 pages.
3rd Generation Partnership Project (3GPP), TS 29.368 V2.0.0, "Technical Specification Group Core Network and Terminals, Tsp Interface Protocol Between the MTC Interworking Function (MTC-IWF) and Service Capability Server (SCS)", Sep. 2012, 23 pages.
3rd Generation Partnership Project (3GPP), TS 32.240 V11.2.0, "Technical Specification Group Services and System Aspects, Telecommunication Management, Charging Management, Charging Architecture and Principles (Release 11)", Dec. 2011, 45 pages.
3rd Generation Partnership Project (3GPP), TS 32.250 V11.0.0, "Technical Specification Group Services and System Aspects, Telecommunication Management, Charging Management, Circuit Switched (CS) Domain Charging (Release 11)", Jun. 2012, 112 pages.
3rd Generation Partnership Project (3GPP), TS 32.295 V11.0.0, "Technical Specification Group Services and System Aspects, Telecommunication Management, Charging Management, Charging Data Record (CDR) Transfer (Release 11)", Sep. 2012, 32 pages.
3rd Generation Partnership Project (3GPP), TS 32.298 V11.5.0, "Technical Specification Group Services and System Aspects, Telecommunication Management, Charging Management, Charging Data Record (CDR) Parameter Description (Release 11)", Dec. 2012, 152 pages.
3rd Generation Partnership Project (3GPP), TS 32.299 V11.6.0, "Technical Specification Group Services and System Aspects, Telecommunication Management, Charging Management, Diameter Charging Applications (Release 11)", Dec. 2012, 152 pages.
3rd Generation Partnership Project (3GPP), TS 33.210 V12.2.0, "Technical Specification Group Services and System Aspects, 3G security, Network Domain Security (NDS), IP Network Layer Security (Release 12)", Dec. 2012, 24 pages.
3rd Generation Partnership Project (3GPP), TS 33.220 V11.4.0, "Technical Specification Group Services and System Aspects, Generic Authentication Architecture (GAA), Generic Bootstrapping Architecture (GBA) (Release 11)", Sep. 2012, 92 pages.
3rd Generation Partnership Project (3GPP), TS 33.310 V11.2.0, "Technical Specification Group Services and System Aspects, Network Domain Security (NDS), Authentication Framework (AF) (Release 11)", Dec. 2012, 54 pages.
Calhoun et al., "Diameter Base Protocol", Network Working Group, Request for Comments: 3588, Sep. 2003, pp. 1-147.
Crocker et al., "Augmented BNF for Syntax Specifications: ABNF", Network Working Group, Request for Comments: 2234, Category: Standards Track, Nov. 1997, pp. 1-14.
Dierks et al., "The Transport Layer Security (TLS) Protocol Version 1.1", Network Working Group, Request for Comments: 4346, Category: Standards Track, Apr. 2006, pp. 1-87.
European Telecommunications Standards Institute (ETSI), TS 102 690 V2.0.10, "Machine-to-Machine communications (M2M), Functional Architecture", Sep. 2012, 301 pages.
Franks et al., "HTTP Authentication: Basic and Digest Access Authentication", Network Working Group, Request for Comments: 2617, Category: Standards Track, Jun. 1999, 30 pages.
Hakala et al., "Diameter Credit-Control Application", Network Working Group, Request for Comments: 4006, Category: Standards Track, Aug. 2005, pp. 1-114.
Niemi et al., "Hypertext Transfer Protocol (HTTP) Digest Authentication Using Authentication and Key Agreement (AKA)", Network Working Group, Request for Comments: 3310, Sep. 2002, pp. 1-18.

NTT DoCoMo, "M2M Communication Core Network Infrastructure and Congestion Control Technology", NTT DoCoMo Technical Journal, vol. 21, No. 2, Jul. 2013, pp. 30-34.
Romascanu et al., "Updated IANA Considerations for Diameter Command Code Allocations", Internet Engineering Task Force (IETF), Request for Comments: 5719, Category: Standards Track, Jan. 2010, pp. 1-5.
CN 102056266 A, Office Action dated Nov. 28, 2017, issued in related Chinese Patent Application No. 201380069559.3.
CN 102202270 A, Office Action dated Nov. 28, 2017, issued in related Chinese Patent Application No. 201380069559.3.
CN 102448042 A, Office Action dated Nov. 28, 2017, issued in related Chinese Patent Application No. 201380069559.3.
CN 102625276 A, Office Action dated Nov. 28, 2017, issued in related Chinese Patent Application No. 201380069559.3.
Orange et al., "WID for Monitoring Enhancement," 3GPP TSG SA WG2 Meeting #91, S2-122510, Kyoto, Japan (May 21-25, 2012).
Third Generation Partnership Project, "Technical Specification Group Services and System Aspects; Network Domain Security (NDS); Authentication Framework (AF) (Release 12)," 3GPP TS 33.310 V12.0.0 (Jun. 2013).
Third Generation Partnership Project, "Technical Specification Group Services and System Aspects; Architecture enhancements to facilitate communications with packet data networks and applications (Release 11)," 3GPP TS 23.682 V11.5.0 (Sep. 2013).
Third Generation Partnership Project, "Technical Specification Group Core Network and Terminals; Organization of subscriber data (Release 11)," 3GPP TS 23.008 V11.9.0 (Dec. 2013).
Third Generation Partnership Project, "Technical Specification Group Core Network and Terminals; Organization of subscriber data (Release 12)," 3GPP TS 23.008 V12.1.0 (Sep. 2013).
Third Generation Partnership Project, "Technical Specification Group Services and System Aspects; General Packet Radio Service (GPRS); Service description; Stage 2 (Release 11)," 3GPP TS 23.060 V11.8.0 (Dec. 2013).
Third Generation Partnership Project, "Technical Specification Group Services and System Aspects; General Packet Radio Service (GPRS); Service description; Stage 2 (Release 12)," 3GPP TS 23.060 V12.3.0 (Dec. 2013).
Third Generation Partnership Project, "Technical Specification Group Services and System Aspects; General Packet Radio Service (GPRS) enhancements for Evolved Universal Terrestrial Radio Access Network (E-UTRAN) access (Release 11)," 3GPP TS 23.401 V11.8.0 (Dec. 2013).
Third Generation Partnership Project, "Technical Specification Group Services and System Aspects; General Packet Radio Service (GPRS) enhancements for Evolved Universal Terrestrial Radio Access Network (E-UTRAN) access (Release 12)," 3GPP TS 23.401 V12.3.0 (Dec. 2013).
Third Generation Partnership Project, "Technical Specification Group Core Network and Terminals; Numbering, addressing and identification (Release 11)," 3GPP TS 23.003 V11.7.0 (Dec. 2013).
Third Generation Partnership Project, "Technical Specification Group Core Network and Terminals; Numbering, addressing and identification (Release 12)," 3GPP TS 23.003 V12.1.0 (Dec. 2013).
Third Generation Partnership Project, "Technical Specification Group Core Network and Terminals; Technical realization of the Short Message Service (SMS) (Release 11)," 3GPP TS 23.040 V11.5.0 (Mar. 2013).
Third Generation Partnership Project, "Technical Specification Group Core Network and Terminals; Technical realization of the Short Message Service (SMS) (Release 12)," 3GPP TS 23.040 V12.2.0 (Dec. 2013).
Third Generation Partnership Project, "Technical Specification Group Services and System Aspects; Study on Machine-Type Communications (MTC) and other mobile data applications communications enhancements (Release 12)," 3GPP TR 23.887 V12.0.0 (Dec. 2013).
Third Generation Partnership Project, "Technical Specification Group Core Network and Terminals; Sh Interface based on the Diameter protocol; Protocol details (Release 11)," 3GPP TS 29.329 V11.7.0 (Jun. 2013).

(56) References Cited

OTHER PUBLICATIONS

Third Generation Partnership Project, "Technical Specification Group Core Network and Terminals; Sh Interface based on the Diameter protocol; Protocol details (Release 12)," 3GPP TS 29.329 V12.1.0 (Jun. 2013).
Third Generation Partnership Project, "Technical Specification Group Core Network and Terminals; Mobile Application Part (MAP) specification (Release 11)," 3GPP TS 29.002 V11.9.0 (Dec. 2013).
Third Generation Partnership Project, "Technical Specification Group Core Network and Terminals; Mobile Application Part (MAP) specification (Release 12)," 3GPP TS 29.002 V12.3.0 (Dec. 2013).
Third Generation Partnership Project, "Technical Specification Group Core Network and Terminals; Tsp Interface protocol between the MTC Interworking Function (MTC-IWF) and Service Capability Server (SCS) (Release 11)," 3GPP TS 29.368 V11.4.0 (Sep. 2013).
Third Generation Partnership Project, "Technical Specification Group Core Network and Terminals; Tsp Interface protocol between the MTC Interworking Function (MTC-IWF) and Service Capability Server (SCS) (Release 11)," 3GPP TS 29.368 V11.1.0 (Dec. 2012).
Third Generation Partnership Project, "Technical Specification Group Core Network and Terminals; Home Subscriber Server (HSS) diameter interfaces for interworking with packet data networks and applications (Release 11)," 3GPP TS 29.336 V11.1.0 (Dec. 2012).
Third Generation Partnership Project, "Technical Specification Group Core Network and Terminals; Home Subscriber Server (HSS) diameter interfaces for interworking with packet data networks and applications (Release 12)," 3GPP TS 29.336 V12.1.0 (Sep. 2013).
Third Generation Partnership Project, "Technical Specification Group Core Network and Terminals; Evolved Packet System (EPS); Mobility Management Entity (MME) and Serving GPRS Support Node (SGSN) related interfaces based on Diameter protocol (Release 11)," 3GPP TS 29.272 V11.9.0 (Dec. 2013).
Third Generation Partnership Project, "Technical Specification Group Core Network and Terminals; Evolved Packet System (EPS); Mobility Management Entity (MME) and Serving GPRS Support Node (SGSN) related interfaces based on Diameter protocol (Release 12)," 3GPP TS 29.272 V12.3.0 (Dec. 2013).
Third Generation Partnership Project, "Technical Specification Group Core Network and Terminals; Diameter-based T4 interface for communications with packet data networks and applications (Release 11)," 3GPP TS 29.337 V11.1.0 (Dec. 2012).
Third Generation Partnership Project, "Technical Specification Group Core Network and Terminals; Diameter-based T4 interface for communications with packet data networks and applications (Release 12)," 3GPP TS 29.337 V12.0.0 (Jun. 2013).
Third Generation Partnership Project, "Technical Specification Group Core Network and Terminals; Diameter-based T4 interface for communications with packet data networks and applications (Release 11)," 3GPP TS 29.337 V11.3.0 (Jun. 2013).
Third Generation Partnership Project, "Technical Specification Group Core Network and Terminals; Non-Access-Stratum (NAS) protocol for Evolved Packet System (EPS); Stage 3 (Release 11)," 3GPP TS 24.301 V11.9.0 (Dec. 2013).
Third Generation Partnership Project, "Technical Specification Group Core Network and Terminals; Non-Access-Stratum (NAS) protocol for Evolved Packet System (EPS); Stage 3 (Release 12)," 3GPP TS 24.301 V12.3.0 (Dec. 2013).
Third Generation Partnership Project, "Technical Specification Group Core Network and Terminals; Mobile radio interface Layer 3 specification; Core network protocols; Stage 3 (Release 12)," 3GPP TS 24.008 V12.4.0 (Dec. 2013).
Third Generation Partnership Project, "Technical Specification Group Core Network and Terminals; Mobile radio interface signalling layer 3; General aspects (Release 12)," 3GPP TS 24.007 V12.0.0 (Jun. 2013).
Third Generation Partnership Project, "Technical Specification Group Services and System Aspects; Telecommunication management; Charging management; Diameter charging applications (Release 12)," 3GPP TS 32.299 V12.3.0 (Dec. 2013).
Third Generation Partnership Project, "Technical Specification Group Services and System Aspects; Telecommunication management; Charging management; Diameter charging applications (Release 11)," 3GPP TS 32.299 V11.10.0 (Dec. 2013).
Third Generation Partnership Project, "Technical Specification Group Services and System Aspects; Telecommunication management; Charging management; Charging architecture and principles (Release 11)," 3GPP TS 32.240 V11.5.0 (Sep. 2012).
Third Generation Partnership Project, "Technical Specification Group Services and System Aspects; Telecommunication management; Charging management; Charging architecture and principles (Release 11)," 3GPP TS 32.240 V11.6.0 (Mar. 2013).
Third Generation Partnership Project, "Technical Specification Group Services and System Aspects; Telecommunication management; Charging management; Charging architecture and principles (Release 12)," 3GPP TS 32.240 V12.3.0 (Dec. 2013).
Third Generation Partnership Project, "Technical Specification Group Services and System Aspects; Telecommunication management; Charging management; Charging Data Record (CDR) transfer (Release 12)," 3GPP TS 32.295 V12.0.0 (Sep. 2013).
Third Generation Partnership Project, "Technical Specification Group Services and System Aspects; Telecommunication management; Charging management; Charging Data Record (CDR) parameter description (Release 12)," 3GPP TS 32.298 V12.2.0 (Dec. 2013).
Third Generation Partnership Project, "Technical Specification Group Services and System Aspects; Telecommunication management; Charging management; Charging Data Record (CDR) parameter description (Release 11)," 3GPP TS 32.298 V11.8.0 (Dec. 2013).
Third Generation Partnership Project, "Technical Specification Group Services and System Aspects; Telecommunication management; Charging management; Circuit Switched (CS) domain charging (Release 11)," 3GPP TS 32.250 V11.1.0 (Mar. 2013).
Third Generation Partnership Project, "Technical Specification Group Services and System Aspects; Vocabulary for 3GPP Specifications (Release 12)," 3GPP TR 21.905 V12.0.0 (Jun. 2013).
Third Generation Partnership Project, "Technical Specification Group Services and System Aspects; Service accessibility (Release 12)," 3GPP TS 22.011 V12.0.0 (Mar. 2013).
Third Generation Partnership Project, "Technical Specification Group Services and System Aspects; Service accessibility (Release 11)," 3GPP TS 22.011 V11.3.0 (Mar. 2013).
Third Generation Partnership Project, "Technical Specification Group Services and System Aspects; Service requirements for Machine-Type Communications (MTC); Stage 1 (Release 12)," 3GPP TS 22.368 V12.3.0 (Dec. 2013).
Third Generation Partnership Project, "Technical Specification Group Services and System Aspects; Generic Authentication Architecture (GAA); Generic Bootstrapping Architecture (GBA) (Release 11)," 3GPP TS 33.220 V11.5.0 (Jun. 2013).
Third Generation Partnership Project, "Technical Specification Group Services and System Aspects; Generic Authentication Architecture (GAA); Generic Bootstrapping Architecture (GBA) (Release 12)," 3GPP TS 33.220 V12.2.0 (Dec. 2013).
Third Generation Partnership Project, "Technical Specification Group Services and System Aspects; System Improvements for Machine-Type Communications; (Release 11)," 3GPP TR 23.888 V1.4.0 (Aug. 2011).
Third Generation Partnership Project, "Technical Specification Group Services and System Aspects; System improvements for Machine-Type Communications (MTC) (Release 11)," 3GPP TR 23.888 V11.0.0 (Sep. 2012).

\* cited by examiner

| ACTION-CAUSE | DETACH_REQUEST (WTRU TERMINATED)-EMM CAUSE |
|---|---|
| UNSPECIFIED | SCS INITIATED – UNSPECIFIED |
| DEVICE-SERVICE-LAYER-SUBSCRIPTION-NOT-VALID | SCS INITIATED – SUBSCRIPTION NOT VALID |
| INTEGRITY-VALIDATION-FAILURE | SCS INITIATED – INTEGRITY VALIDATION FAILURE |
| LOCATION-NOT-ALLOWED | SCS INITIATED – LOCATION NOT ALLOWED |
| ACCESS-NOT-PERMITTED-AT-THIS-TIME | SCS INITIATED – UNSPECIFIED<br>NOTE: THE T5 REQUEST SHOULD HAVE INCLUDED A BACKOFF TIME, THUS THE DETACH TYPE SHOULD BE "RE-ATTACH REQUIRED" AND THE EMM CAUSE WILL BE IGNORED BY THE WTRU. |
| DATA-LIMIT-REACHED | SCS INITIATED – UNSPECIFIED<br>NOTE: THE T5 REQUEST SHOULD HAVE INCLUDED A BACKOFF TIME, THUS THE DETACH TYPE SHOULD BE "RE-ATTACH REQUIRED" AND THE EMM CAUSE WILL BE IGNORED BY THE WTRU. |
| SCS-CONGESTED | SCS INITIATED – UNSPECIFIED<br>NOTE: THE T5 REQUEST SHOULD HAVE INCLUDED A BACKOFF TIME, THUS THE DETACH TYPE SHOULD BE "RE-ATTACH REQUIRED" AND THE EMM CAUSE WILL BE IGNORED BY THE WTRU. |

FIG. 3

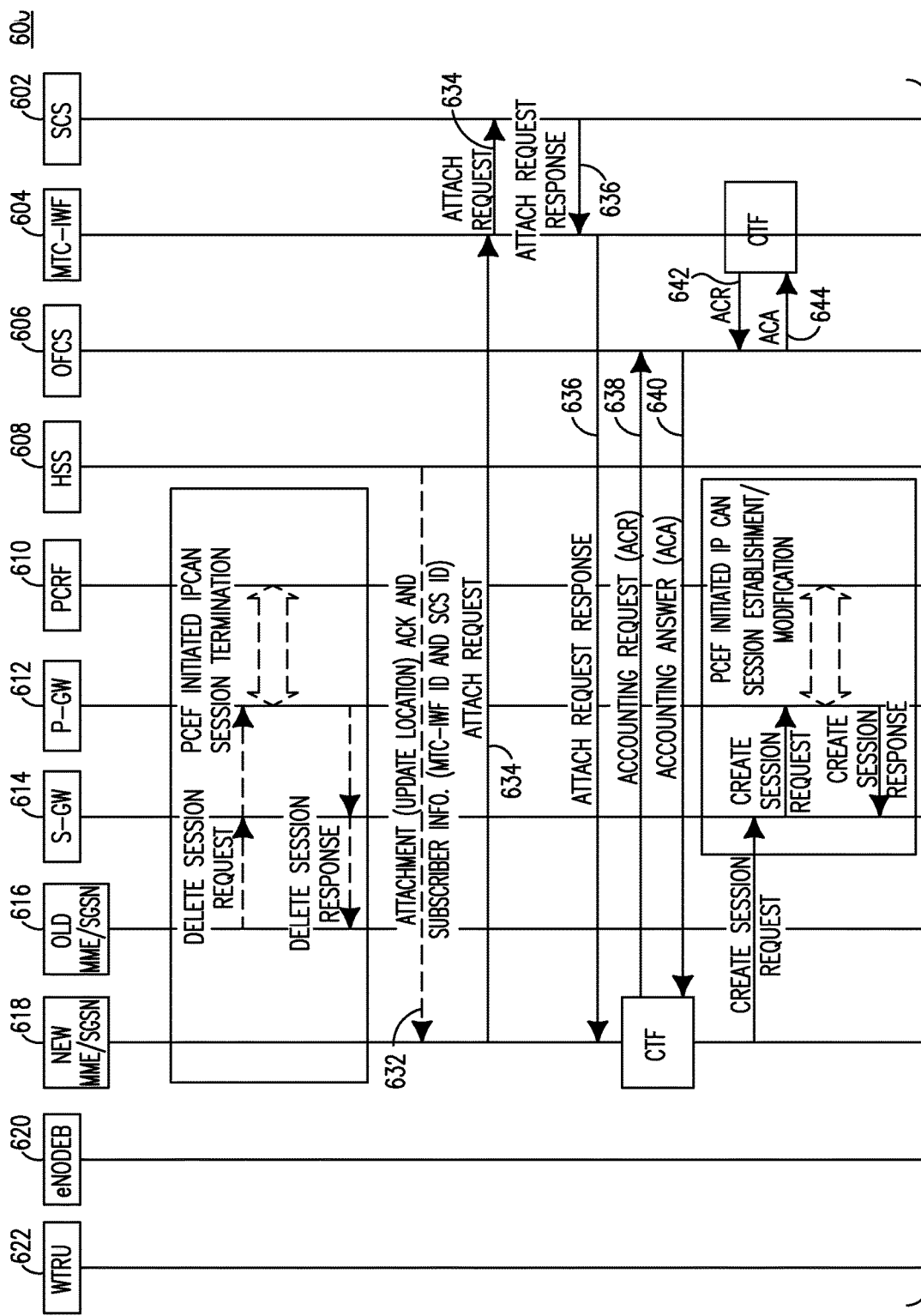

| IEI | INFORMATION ELEMENT | TYPE/REFERENCE | PRESENCE | FORMAT | LENGTH |
|---|---|---|---|---|---|
| | MOBILITY MANAGEMENT PROTOCOL DISCRIMINATOR | PROTOCOL DISCRIMINATOR | M | V | 1/2 |
| | SKIP INDICATOR | SKIP INDICATOR | M | V | 1/2 |
| | LOCATION UPDATING ACCEPT MESSAGE TYPE | MESSAGE TYPE | M | V | 1 |
| | LOCATION AREA IDENTIFICATION | LOCATION AREA IDENTIFICATION | M | V | 5 |
| 17 | MOBILE IDENTITY | MOBILE IDENTITY | O | TLV | 3-10 |
| A1 | FOLLOW ON PROCEED | FOLLOW ON PROCEED | O | T | 1 |
| A2 | CTS PERMISSION | CTS PERMISSION | O | T | 1 |
| 4A | EQUIVALENT PLMNs | PLMN LIST | O | TLV | 5-47 |
| 34 | EMERGENCY NUMBER LIST | EMERGENCY NUMBER LIST | O | TLV | 5-50 |
| 35 | PER MS T3212 | GPRS TIMER 3 | O | TLV | 3 |
| | REJECT CAUSE | REJECT CAUSE | O | V | 1 |
| TBD | SCS BACKOFF TIMER | SCS BACKOFF TIMER | O | TLV | 2 |

| IEI | INFORMATION ELEMENT | TYPE/REFERENCE | PRESENCE | FORMAT | LENGTH |
|---|---|---|---|---|---|
| | MOBILITY MANAGEMENT PROTOCOL DISCRIMINATOR | PROTOCOL DISCRIMINATOR | M | V | 1/2 |
| | SKIP INDICATOR | SKIP INDICATOR | M | V | 1/2 |
| | LOCATION UPDATING REJECT MESSAGE TYPE | MESSAGE TYPE | M | V | 1 |
| | REJECT CAUSE | REJECT CAUSE | M | V | 1 |
| 36 | T3246 VALUE | MM TIMER | O | TLV | 3 |
| TBD | SCS BACKOFF TIMER | SCS BACKOFF TIMER | O | TLV | 2 |

| IEI | INFORMATION ELEMENT | TYPE/REFERENCE | PRESENCE | FORMAT | LENGTH |
|---|---|---|---|---|---|
| | PROTOCOL DISCRIMINATOR | PROTOCOL DISCRIMINATOR | M | V | 1/2 |
| | SKIP INDICATOR | SKIP INDICATOR | M | V | 1/2 |
| | ATTACH ACCEPT MESSAGE IDENTITY | MESSAGE TYPE | M | V | 1 |
| | ATTACH RESULT | ATTACH RESULT | M | V | 1/2 |
| | FORCE TO STANDBY | FORCE TO STANDBY | M | V | 1/2 |
| | PERIODIC RA UPDATE TIMER | GPRS TIMER | M | V | 1 |
| | RADIO PRIORITY FOR SMS | RADIO PRIORITY | M | V | 1/2 |
| | RADIO PRIORITY FOR TOM8 | RADIO PRIORITY 2 | M | V | 1/2 |
| | ROUTING AREA IDENTIFICATION | ROUTING AREA IDENTIFICATION | M | V | 6 |
| 19 | P-TMSI SIGNATURE | P-TMSI SIGNATURE | O | TV | 4 |
| 17 | NEGOIATED READY TIMER VALUE | GPRS TIMER | O | TV | 2 |
| 18 | ALLOCATED P-TMSI | MOBILE IDENTITY | O | TLV | 7 |
| 23 | MS IDENTITY | MOBILE IDENTITY | O | TLV | 7-10 |
| 25 | GMM CAUSE | GMM CAUSE | O | TLV | 2 |
| 2A | T3302 VALUE | GPRS TIMER 2 | O | TLV | 3 |
| 8C | CELL NOTIFICATION | CELL NOTIFICATION | O | T | 1 |
| 4A | EQUIVALENT PLMNs | PLMN LIST | O | TLV | 5-47 |
| B- | NETWORK FEATURE SUPPORT | NETWORK FEATURE SUPPORT | O | TLV | 1 |
| 34 | EMERGENCY NUMBER LIST | EMERGENCY NUMBER LIST | O | TLV | 5-50 |
| A- | REQUESTED MS INFORMATION | REQUESTED MS INFORMATION | O | TLV | 1 |
| 37 | T3319 VALUE | GPRS TIMER 2 | O | TLV | 3 |
| 38 | T3323 VALUE | GPRS TIMER 2 | O | TLV | 3 |
| 39 | T3312 VALUE | GPRS TIMER 3 | O | TLV | 3 |
| 66 | ADDITIONAL NETWORK FEATURE SUPPORT | ADDITIONAL NETWORK FEATURE SUPPORT | O | TLV | 3 |
| TBD | SCS BACKOFF TIMER | SCS BACKOFF TIMER | O | TLV | 2 |

| IEI | INFORMATION ELEMENT | TYPE/REFERENCE | PRESENCE | FORMAT | LENGTH |
|---|---|---|---|---|---|
|  | PROTOCOL DISCRIMINATOR | PROTOCOL DISCRIMINATOR | M | V | 1/2 |
|  | SKIP INDICATOR | SKIP INDICATOR | M | V | 1/2 |
|  | ATTACH REJECT MESSAGE IDENTITY | MESSAGE IDENTITY | M | V | 1 |
|  | GMM CAUSE | GMM CAUSE | M | V | 1 |
| 2A | T3302 VALUE | GPRS TIMER 2 | O | TLV | 3 |
| 3A | T3346 VALUE | GPRS TIMER 2 | O | TLV | 3 |
| 66 | ADDITIONAL NETWORK FEATURE SUPPORT | ADDITIONAL NETWORK FEATURE SUPPORT | O | TLV | 3 |
| TBD | SCS BACKOFF TIMER — 1005 | SCS BACKOFF TIMER | O | TLV | 2 |

| IEI | INFORMATION ELEMENT | TYPE/REFERENCE | PRESENCE | FORMAT | LENGTH |
|---|---|---|---|---|---|
|  | PROTOCOL DISCRIMINATOR | PROTOCOL DISCRIMINATOR | M | V | 1/2 |
|  | SKIP INDICATOR | SKIP INDICATOR | M | V | 1/2 |
|  | DETACH REQUEST MESSAGE IDENTITY | MESSAGE IDENTITY | M | V | 1 |
|  | DETACH TYPE | DETACH TYPE | M | V | 1/2 |
|  | FORCE TO STANDBY | FORCE TO STANDBY | M | V | 1/2 |
| 25 | GMM CAUSE | GMM CAUSE | O | TLV | 2 |
| TBD | SCS BACKOFF TIMER | SCS BACKOFF TIMER | O | TLV | 2 |
| F— | ADDITIONAL NETWORK FEATURE SUPPORT — 1105 | ADDITIONAL NETWORK FEATURE SUPPORT | O | TLV | 1 |

— 1110

| IEI | INFORMATION ELEMENT | TYPE/REFERENCE | PRESENCE | FORMAT | LENGTH |
|---|---|---|---|---|---|
| | PROTOCOL DISCRIMINATOR | PROTOCOL DISCRIMINATOR | M | V | 1/2 |
| | SECURITY HEADER TYPE | SECURITY HEADER TYPE | M | V | 1/2 |
| | ATTACH ACCEPT MESSAGE IDENTITY | MESSAGE IDENTITY | M | V | 1 |
| | EPS ATTACH RESULT | EPS ATTACH RESULT | M | V | 1/2 |
| | SPARE HALF OCTET | SPARE HALF OCTET | M | V | 1/2 |
| | T3412 VALUE | GPRS TIMER | M | V | 1 |
| | TAI LIST | TRACKING AREA IDENTITY LIST | M | LV | 7–97 |
| | ESM MESSAGE CONTAINER | ESM MESSAGE CONTAINER | M | LV | 5–n |
| 50 | GUTI | EPS MOBILE IDENTITY | O | TLV | 13 |
| 13 | LOCATION AREA IDENTIFICATION | LOCATION AREA IDENTIFICATION | O | TV | 6 |
| 23 | MS IDENTITY | MOBILE IDENTITY | O | TLV | 7–10 |
| 53 | EMM CAUSE 1215 | EMM CAUSE | O | TV | 2 |
| 17 | T3402 VALUE | GPRS TIMER | O | TLV | 2 |
| 59 | T3423 VALUE | GPRS TIMER | O | TV | 2 |
| 4A | EQUIVALENT PLMNs | PLMN LIST | O | TLV | 5–47 |
| 34 | EMERGENCY NUMBER LIST | EMERGENCY NUMBER LIST | O | TLV | 5–50 |
| 64 | EPS NETWORK FEATURE SUPPORT | EPS NETWORK FEATURE SUPPORT | O | TLV | 3 |
| F– | ADDITIONAL UPDATE RESULT | ADDITIONAL UPDATE RESULT | O | TLV | 3 |
| 5E | T3412 EXTENDED VALUE | GPRS TIMER 3 | O | TLV | 3 |
| TBD | SCS BACKOFF TIMER | SCS BACKOFF TIMER | O | TLV | 2 |

| IEI | INFORMATION ELEMENT | TYPE/REFERENCE | PRESENCE | FORMAT | LENGTH |
|---|---|---|---|---|---|
| | PROTOCOL DISCRIMINATOR | PROTOCOL DISCRIMINATOR | M | V | 1/2 |
| | SECURITY HEADER TYPE | SECURITY HEADER TYPE | M | V | 1/2 |
| | ATTACH REJECT MESSAGE IDENTITY | MESSAGE IDENTITY | M | V | 1 |
| | EMM CAUSE | EMM CAUSE | M | V | 1 |
| 78 | ESM MESSAGE CONTAINER | ESM MESSAGE CONTAINER | O | TLV-E | 6-n |
| 5F | T3346 VALUE | GPRS TIMER 2 | O | TLV | 3 |
| TBD | SCS BACKOFF TIMER | SCS BACKOFF TIMER | O | TLV | 2 |
| F- | ADDITIONAL UPDATE RESULT | ADDITIONAL UPDATE RESULT | O | TLV | 1 |

| IEI | INFORMATION ELEMENT | TYPE/REFERENCE | PRESENCE | FORMAT | LENGTH |
|---|---|---|---|---|---|
| | PROTOCOL DISCRIMINATOR | PROTOCOL DISCRIMINATOR | M | V | 1/2 |
| | SECURITY HEADER TYPE | SECURITY HEADER TYPE | M | V | 1/2 |
| | DETACH REQUEST MESSAGE IDENTITY | MESSAGE IDENTITY | M | V | 1 |
| | DETACH TYPE | DETACH TYPE | M | V | 1/2 |
| | SPARE HALF OCTET | SPARE HALF OCTET | M | V | 1/2 |
| F- | ADDITIONAL UPDATE RESULT | ADDITIONAL UPDATE RESULT | O | TLV | 1 |
| TBD | SCS BACKOFF TIMER | SCS BACKOFF TIMER | O | TLV | 2 |

| 8 | 7 | 6 | 5 | 4 | 3 | 2 | 1 | |
|---|---|---|---|---|---|---|---|---|
| REJECT CAUSE IEI ||||||||  OCTET 1 |
| REJECT CAUSE VALUE |||||||| OCTET 2 |

```
REJECT CAUSE VALUE (OCTET 2)
BITS
8 7 6 5 4 3 2 1
0 0 0 0 0 0 1 0    IMSI UNKNOWN IN HLR
0 0 0 0 0 0 1 1    ILLEGAL MS
0 0 0 0 0 1 0 0    IMSI UNKNOWN IN VLR
0 0 0 0 0 1 0 1    IMEI NOT ACCEPTED
0 0 0 0 0 1 1 0    ILLEGAL ME
0 0 0 0 1 0 1 1    PLMN NOT ALLOWED
0 0 0 0 1 1 0 0    LOCATION AREA NOT ALLOWED
0 0 0 0 1 1 0 1    ROAMING NOT ALLOWED IN THIS LOCATION AREA
0 0 0 0 1 1 1 1    NO SUITABLE CELLS IN LOCATION AREA
0 0 0 1 0 0 0 1    NETWORK FAILURE
0 0 0 1 0 1 0 0    MAC FAILURE
0 0 0 1 0 1 0 1    SYNCH FAILURE
0 0 0 1 0 1 1 0    CONGESTION
0 0 0 1 0 1 1 1    GSM AUTHENTICATION UNACCEPTABLE
0 0 0 1 1 0 0 1    NOT AUTHORIZED FOR THIS CSG
0 0 1 0 0 0 0 0    SERVICE OPTION NOT SUPPORTED
0 0 1 0 0 0 0 1    REQUESTED SERVICE OPTION NOT SUBSCRIBED
0 0 1 0 0 0 1 0    SERVICE OPTION TEMPORALLY OUT OF ORDER
0 0 1 0 0 1 1 0    CALL CANNOT BE IDENTIFIED
0 0 1 1 0 0 0 0    }
TO                 } RETRY UPON ENTRY INTO A NEW CELL
0 0 1 1 1 1 1 1    }
0 1 0 1 1 1 1 1    SEMANTICALLY INCORRECT MESSAGE
0 1 1 0 0 0 0 0    INVALID MANDATORY INFORMATION
0 1 1 0 0 0 0 1    MESSAGE TYPE NON-EXISTENT OR NOT IMPLEMENTED
0 1 1 0 0 0 1 0    MESSAGE TYPE NOT COMPATIBLE WITH THE PROTOCOL STATE
0 1 1 0 0 0 1 1    INFORMATION ELEMENT NON-EXISTENT OR NOT IMPLEMENTED
0 1 1 0 0 1 0 0    CONDITIONAL IE ERROR
0 1 1 0 0 1 0 1    MESSAGE NOT COMPATIBLE WITH THE PROTOCOL STATE
0 1 1 0 1 1 1 1    PROTOCOL ERROR, UNSPECIFIED
1 0 0 0 0 0 0 0    SCS REJECTED-SUBSCRIPTION NOT VALID
1 0 0 0 0 0 0 1    SCS REJECTED-INTEGRITY VALIDATION FAILURE
1 0 0 0 0 0 1 0    SCS REJECTED-LOCATION NOT ALLOWED
1 0 0 0 0 0 1 1    SCS REJECTED-OTHER

ANY OTHER VALUE RECEIVED BY THE MOBILE STATION SHALL BE TREATED AS 0010 0010, "SERVICE
OPTION TEMPORALLY OUT OF ORDER". ANY OTHER VALUE RECEIVED BY THE NETWORK SHALL BE
TREATED AS 0110 1111, "PROTOCOL ERROR, UNSPECIFIED".
```

FIG. 15

```
     8      7      6      5      4      3      2      1
  ┌─────────────────────────────────────────────────────┐
  │              SCS BACKOFF TIMER IEI                  │  OCTET 1
  ├─────────────────────┬───────────────────────────────┤
  │        UNIT         │          TIMER VALUE          │  OCTET 2
  └─────────────────────┴───────────────────────────────┘
```

TIMER VALUE (OCTET 2)

BITS 5 TO 1 REPRESENT THE BINARY CODED TIMER VALUE.

BITS 6 TO 8 DEFINES THE TIMER VALUE UNIT FOR THE SCS
BACKOFF TIMER AS FOLLOWS:

BITS
8 7 6
0 0 0      VALUE IS INCREMENTED IN MULTIPLES OF 2 SECONDS
0 0 1      VALUE IS INCREMENTED IN MULTIPLES OF 1 MINUTE
0 1 0      VALUE IS INCREMENTED IN MULTIPLES OF DECIHOURS
0 1 1      VALUE IS INCREMENTED IN MULTIPLES OF HOURS
1 0 0      VALUE IS INCREMENTED IN MULTIPLES OF 12 HOURS
1 0 1      VALUE IS INCREMENTED IN MULTIPLES OF DAYS
1 1 0      RESERVED
1 1 1      RESERVED

FIG. 16

```
     8      7      6      5      4      3      2      1
  ┌─────────────────────────────────────────────────────┐
  │         ADDITIONAL NETWORK FEATURE SUPPORT IEI      │  OCTET 1
  ├─────────────────────────────────────────────────────┤
  │    LENGTH OF ADDITIONAL NETWORK FEATURE SUPPORT CONTENTS │ OCTET 2
  ├────┬────┬────┬────┬────┬─────────────┬──────────────┤
  │ 0  │ 0  │ 0  │ 0  │ 0  │  SCS CAUSE  │   GPRS-SMS   │  OCTET 3
  │          SPARE         │             │              │
  └────────────────────────┴─────────────┴──────────────┘
```

GPRS-SMS SUPPORTED (GPRS-SMS) (OCTET 3, BIT 1)

BIT
1
0      SMS VIA GPRS SUPPORTED
1      SMS VIA GPRS NOT SUPPORTED

BIT
3 2
0 1      SCS REJECTED – SUBSCRIPTION NOT VALID
0 1      SCS REJECTED – INTEGRITY VALIDATION FAILURE
1 0      SCS REJECTED – LOCATION NOT ALLOWED
1 1      SCS REJECTED – OTHER

BITS 4 TO 8 OF OCTET 3 ARE SPARE AND SHALL BE CODED ALL ZERO

FIG. 17

|   8   |   7   |   6   |   5   |   4   |   3   |   2   |   1   |         |
|-------|-------|-------|-------|-------|-------|-------|-------|---------|
| GMM CAUSE IEI ||||||||  OCTET 1 |
| CAUSE VALUE ||||||||  OCTET 2 |

CAUSE VALUE (OCTET 2)
BITS
| 8 7 6 5 4 3 2 1 | |
|---|---|
| 0 0 0 0 0 0 1 0 | IMSI UNKNOWN IN HLR |
| 0 0 0 0 0 0 1 1 | ILLEGAL MS |
| 0 0 0 0 0 1 0 1 | IMEI NOT ACCEPTED |
| 0 0 0 0 0 1 1 0 | ILLEGAL ME |
| 0 0 0 0 0 1 1 1 | GPRS SERVICES NOT ALLOWED |
| 0 0 0 0 1 0 0 0 | GPRS SERVICES AND NON-GPRS SERVICES NOT ALLOWED |
| 0 0 0 0 1 0 0 1 | MS IDENTITY CANNOT BE DERIVED BY THE NETWORK |
| 0 0 0 0 1 0 1 0 | IMPLICITY DETACHED |
| 0 0 0 0 1 0 1 1 | PLMN NOT ALLOWED |
| 0 0 0 0 1 1 0 0 | LOCATION AREA NOT ALLOWED |
| 0 0 0 0 1 1 0 1 | ROAMING NOT ALLOWED IN THIS LOCATION AREA |
| 0 0 0 0 1 1 1 0 | GPRS SERVICES NOT ALLOWED IN THIS PLMN |
| 0 0 0 0 1 1 1 1 | NO SUITABLE CELLS IN LOCATION AREA |
| 0 0 0 1 0 0 0 0 | MSC TEMPORAILY NOT REACHABLE |
| 0 0 0 1 0 0 0 1 | NETWORK FAILURE |
| 0 0 0 1 0 1 0 0 | MAC FAILURE |
| 0 0 0 1 0 1 0 1 | SYNCH FAILURE |
| 0 0 0 1 0 1 1 0 | CONGESTION |
| 0 0 0 1 0 1 1 1 | GSM AUTHENTICATION UNACCEPTABLE |
| 0 0 0 1 1 0 0 1 | NOT AUTHORIZED FOR THIS CSG |
| 0 0 0 1 1 1 0 0 | SMS PROVIDED VIA GPRS IN THIS ROUTING AREA |
| 0 0 1 0 1 0 0 0 | NO PDP CONTENT ACTIVATED |
| 0 0 1 1 0 0 0 0 | } |
| TO | } RETRY UPON ENTRY INTO A NEW CELL |
| 0 0 1 1 1 1 1 1 | } |
| 0 1 0 1 1 1 1 1 | SEMANTICALLY INCORRECT MESSAGE |
| 0 1 1 0 0 0 0 0 | INVALID MANDATORY INFORMATION |
| 0 1 1 0 0 0 0 1 | MESSAGE TYPE NON-EXISTENT OR NOT IMPLEMENTED |
| 0 1 1 0 0 0 1 0 | MESSAGE TYPE NOT COMPATIBLE WITH THE PROTOCOL STATE |
| 0 1 1 0 0 0 1 1 | INFORMATION ELEMENT NON-EXISTENT OR NOT IMPLEMENTED |
| 0 1 1 0 0 1 0 0 | CONDITIONAL IE ERROR |
| 0 1 1 0 0 1 0 1 | MESSAGE NOT COMPATIBLE WITH THE PROTOCOL STATE |
| 0 1 1 0 1 1 1 1 | PROTOCOL ERROR, UNSPECIFIED |

ANY OTHER VALUE RECEIVED BY THE MOBILE STATION SHALL BE TREATED AS 0010 0010, "SERVICE OPTION TEMPORALLY OUT OF ORDER". ANY OTHER VALUE RECEIVED BY THE NETWORK SHALL BE TREATED AS 0110 1111, "PROTOCOL ERROR, UNSPECIFIED".

FIG. 18

|   8   |   7   |   6   |   5   |   4   |   3   |   2   |   1   | |
|---|---|---|---|---|---|---|---|---|
| | | | GMM CAUSE IEI | | | | | OCTET 1 |
| | | | CAUSE VALUE | | | | | OCTET 2 |

```
CAUSE VALUE (OCTET 2)
BITS
8 7 6 5 4 3 2 1
0 0 0 0 0 0 1 0    IMSI UNKNOWN IN HSS
0 0 0 0 0 0 1 1    ILLEGAL WTRU
0 0 0 0 0 1 0 1    IMEI NOT ACCEPTED
0 0 0 0 0 1 1 0    ILLEGAL ME
0 0 0 0 0 1 1 1    EPS SERVICES NOT ALLOWED
0 0 0 0 1 0 0 0    EPS SERVICES AND NON-EPS SERVICES NOT ALLOWED
0 0 0 0 1 0 0 1    WTRU IDENTITY CANNOT BE DERIVED BY THE NETWORK
0 0 0 0 1 0 1 0    IMPLICITLY DETACHED
0 0 0 0 1 0 1 1    PLMN NOT ALLOWED
0 0 0 0 1 1 0 0    TRACKING AREA NOT ALLOWED
0 0 0 0 1 1 0 1    ROAMING NOT ALLOWED IN THIS TRACKING AREA
0 0 0 0 1 1 1 0    EPS SERVICES NOT ALLOWED IN THIS PLMN
0 0 0 0 1 1 1 1    NO SUITABLE CELLS IN TRACKING AREA
0 0 0 1 0 0 0 0    MSC TEMPORALLY NOT REACHABLE
0 0 0 1 0 0 0 1    NETWORK FAILURE
0 0 0 1 0 0 1 0    CS DOMAIN NOT AVAILABLE
0 0 0 1 0 0 1 1    ESM FAILURE
0 0 0 1 0 1 0 0    MAC FAILURE
0 0 0 1 0 1 0 1    SYNCH FAILURE
0 0 0 1 0 1 1 0    CONGESTION
0 0 0 1 0 1 1 1    WTRU SECURITY CAPABILITIES MISMATCH
0 0 0 1 1 0 0 0    SECURITY MODE REJECTED, UNSPECIFIED
0 0 0 1 1 0 0 1    NOT AUTHORIZED FOR THIS CSG
0 0 0 1 1 0 1 0    NON-EPS AUTHENTICATION UNACCEPTABLE
0 0 1 0 0 0 1 1    REQUESTED SERVICE OPTION NOT AUTHORIZED IN THIS PLMN
0 0 1 0 0 1 1 1    CS SERVICE TEMPORALY NOT AVAILABLE
0 0 1 0 1 0 0 0    NO EPS BEARER CONTEXT ACTIVATED
0 1 0 1 1 1 1 1    SEMANTICALLY INCORRECT MESSAGE
0 1 1 0 0 0 0 0    INVALID MANDATORY INFORMATION
0 1 1 0 0 0 0 1    MESSAGE TYPE NON-EXISTENT OR NOT IMPLEMENTED
0 1 1 0 0 0 1 0    MESSAGE TYPE NOT COMPATIBLE WITH THE PROTOCOL STATE
0 1 1 0 0 0 1 1    INFORMATION ELEMENT NON-EXISTENT OR NOT IMPLEMENTED
0 1 1 0 0 1 0 0    CONDITIONAL IE ERROR
0 1 1 0 0 1 0 1    MESSAGE NOT COMPATIBLE WITH THE PROTOCOL STATE
0 1 1 0 1 1 1 1    PROTOCOL ERROR, UNSPECIFIED
ANY OTHER VALUE RECEIVED BY THE MOBILE STATION SHALL BE TREATED AS 0110 1111,
"PROTOCOL ERROR, UNSPECIFIED".
```

FIG. 19

METHOD AND APPARATUS FOR PROCESSING SERVICE LAYER DETACH COMMANDS AND ATTACH NOTIFICATIONS

CROSS REFERENCE TO RELATED APPLICATION

This application is the National Stage Entry under 35 U.S.C. § 371 of Patent Cooperation Treaty Application No. PCT/US2013/077617, filed Dec. 23, 2013, which claims the benefit of U.S. Provisional Application Ser. No. 61/748,908 filed Jan. 4, 2013, the contents of which are incorporated herein by reference in their entirety.

BACKGROUND

A machine type communication (MTC) device may be programmed to periodically connect to a network and check in with an MTC server to determine whether a particular task needs to be performed. Often, the MTC server may want to inform the MTC device that there are no tasks to be performed and that the device may transition to a low power state. However, the MTC device may have to establish user plane communication in order to be informed by the MTC server.

In many MTC uses cases, the MTC server may detach events such as theft, roaming into a prohibited areas, and integrity validation failures. When this occurs, it may not be possible for a services capability server (SCS) to instruct a wireless transmit/receive unit (WTRU) to detach from the network.

SUMMARY

A method and apparatus are described for processing service layer detach commands and attach notifications. A services capability server (SCS) may request a core network to perform a network initiated detach of a device. This procedure may be used when the SCS knows that the device will not be needed for a long time or when the SCS detects some event that may warrant a detach, (e.g., theft, disallowed location, integrity validation failure). The SCS may be asked if the device may be allowed to attach at this time. If the SCS indicates that the attach may be rejected, the device may not be allowed to attach until a later time, thus avoiding additional activity on control and user planes. The SCS may be informed when a device is attached based on various subscription fields stored in a home subscriber server (HSS).

BRIEF DESCRIPTION OF THE DRAWINGS

A more detailed understanding may be had from the following description, given by way of example in conjunction with the accompanying drawings wherein:

FIG. 3 shows mobility management entity (MME) mapping of action-cause to additional update result for a T5 detach request;

FIGS. 6A-6D show signal flow of a network-assisted attach to SCS procedure for long term evolution (LTE);

FIG. 7 shows a location updating accept message content;

FIG. 8 shows a location updating reject message content;

FIG. 9 shows attach accept message content;

FIG. 10 shows attach reject message content;

FIG. 11 shows detach request message content;

FIG. 12 shows attach accept message content;

FIG. 13 shows attach reject message content;

FIG. 14 shows detach request message content;

FIG. 15 shows a reject cause information element (IE);

FIG. 16 shows an SCS backoff timer IE;

FIG. 17 shows an additional network support feature IE;

FIG. 18 shows a global multimedia mobility (GMM) cause IE;

FIG. 19 shows an evolved packet system (EPS) mobility management (EMM) cause IE;

DETAILED DESCRIPTION

Figure 1A:
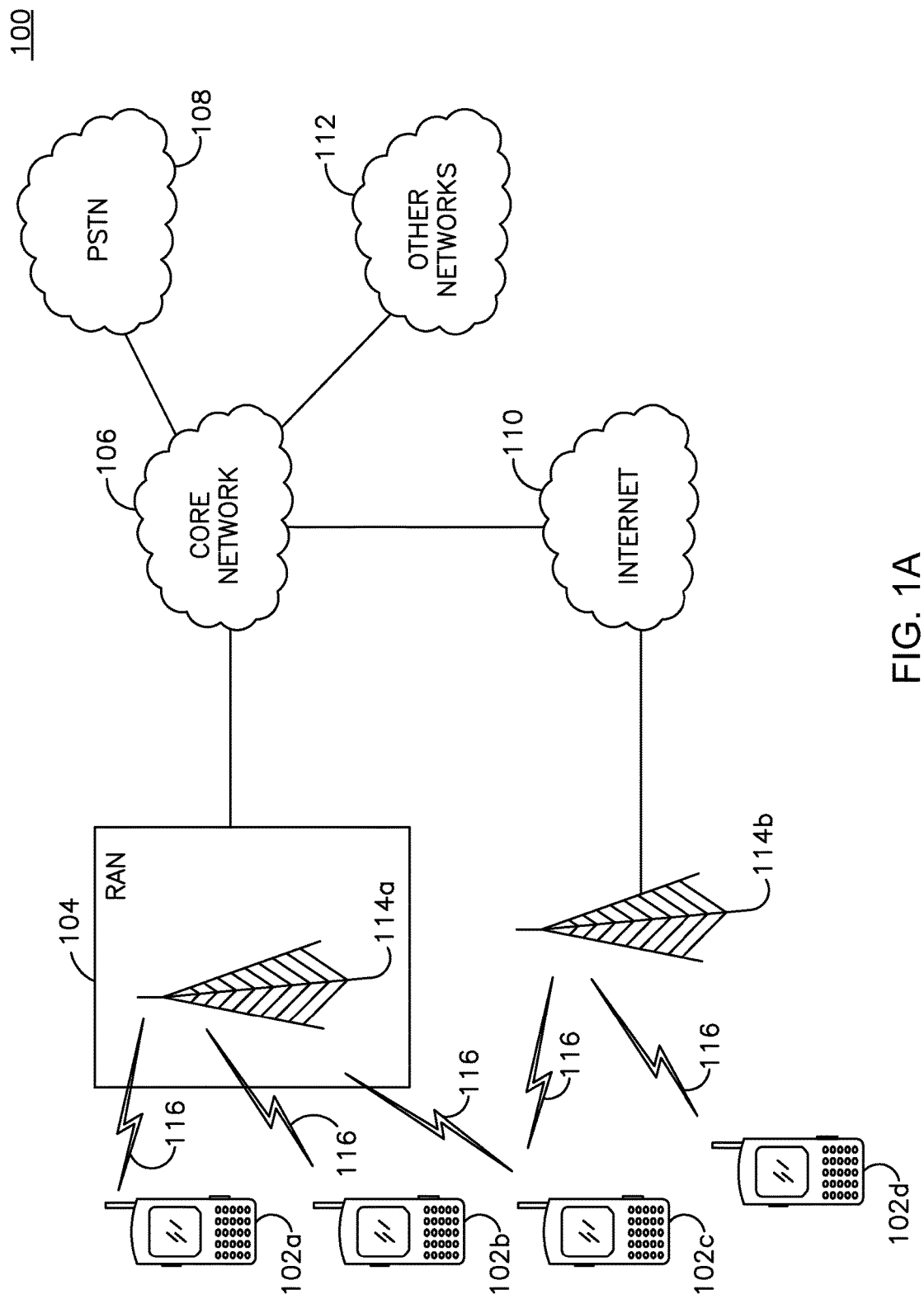
FIG. 1A shows an example communications system in which one or more disclosed embodiments may be implemented.

FIG. 1A shows an example communications system 100 in which one or more disclosed embodiments may be implemented. The communications system 100 may be a multiple access system that provides content, such as voice, data, video, messaging, broadcast, and the like, to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an evolved Node-B (eNB), a Home Node-B (HNB), a Home eNB (HeNB), a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link, (e.g., radio frequency (RF), microwave, infrared (IR), ultraviolet (UV), visible light, and the like). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as universal mobile telecommunications system (UMTS) terrestrial radio access (UTRA), which may establish the air interface 116 using wideband CDMA (WCDMA). WCDMA may include communication protocols such as high-speed packet access (HSPA) and/or evolved HSPA (HSPA+). HSPA may include high-speed downlink packet access (HSDPA) and/or high-speed uplink packet access (HSUPA).

In another embodiment, the base station 114a and the WTRUs 102a, 102b, 102c may implement a radio technology such as evolved UTRA (E-UTRA), which may establish the air interface 116 using long term evolution (LTE) and/or LTE-Advanced (LTE-A).

In other embodiments, the base station 114a and the WTRUs 102a, 102b, 102c may implement radio technologies such as IEEE 802.16 (i.e., worldwide interoperability for microwave access (WiMAX)), CDMA2000, CDMA2000 1x, CDMA2000 evolution-data optimized (EV-DO), Interim Standard 2000 (IS-2000), Interim Standard 95 (IS-95), Interim Standard 856 (IS-856), global system for mobile communications (GSM), enhanced data rates for GSM evolution (EDGE), GSM/EDGE RAN (GERAN), and the like.

The base station 114b in FIG. 1A may be a wireless router, HNB, HeNB, or AP, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT, (e.g., WCDMA, CDMA2000, GSM, LTE, LTE-A, and the like), to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over Internet protocol (VoIP) services to one or more of the WTRUs 102a, 102b, 102c, 102d. For example, the core network 106 may provide call control, billing services, mobile location-based services, pre-paid calling, Internet connectivity, video distribution, and the like, and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the Internet protocol (IP) in the TCP/IP suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
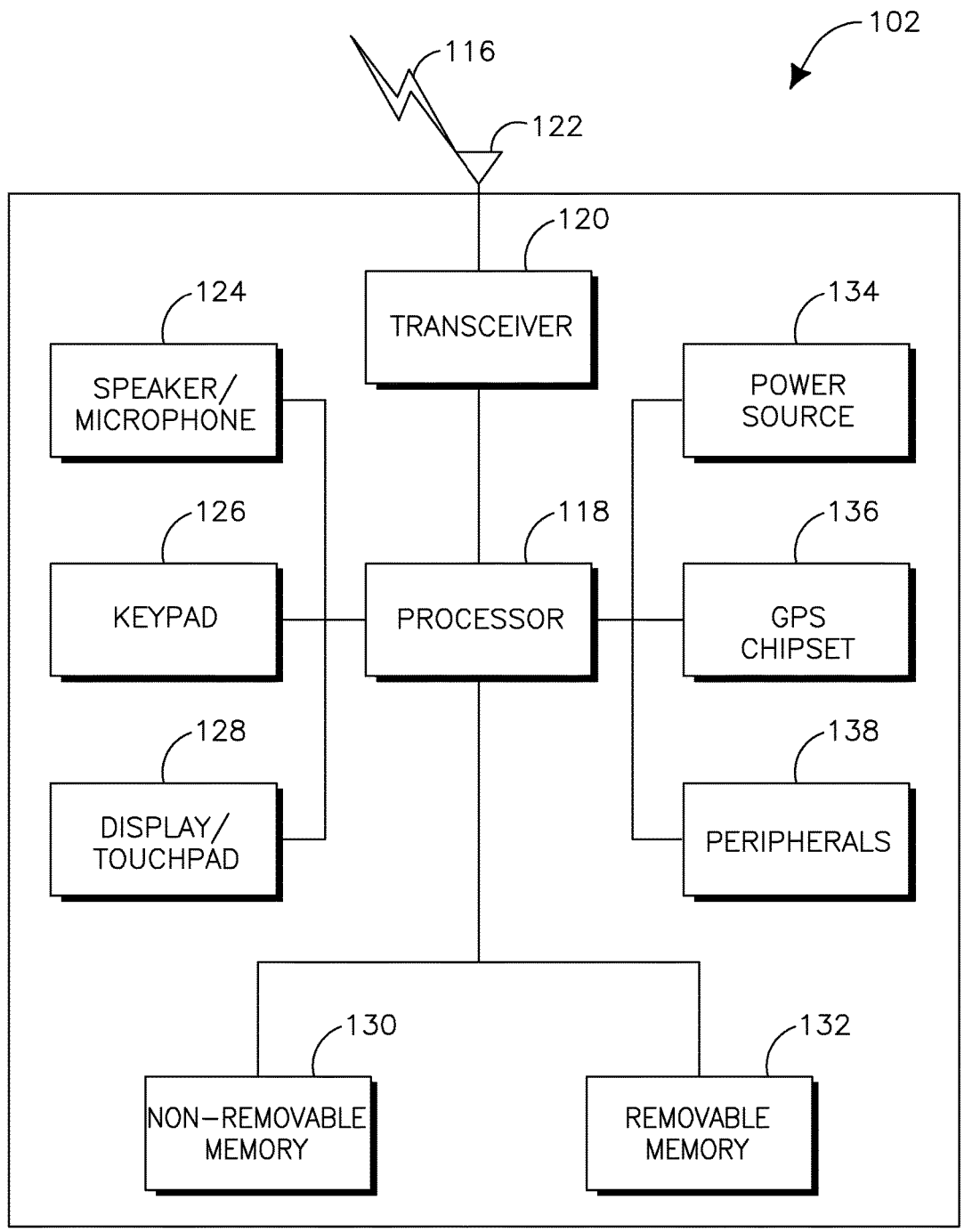
FIG. 1B shows an example wireless transmit/receive unit (WTRU) that may be used within the communications system shown in FIG. 1A.

FIG. 1B shows an example WTRU 102 that may be used within the communications system 100 shown in FIG. 1A. As shown in FIG. 1B, the WTRU 102 may include a processor 118, a transceiver 120, a transmit/receive element, (e.g., an antenna), 122, a speaker/microphone 124, a keypad 126, a display/touchpad 128, a non-removable memory 130, a removable memory 132, a power source 134, a global positioning system (GPS) chipset 136, and peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a microprocessor, one or more microprocessors in association with a DSP core, a controller, a microcontroller, an application specific integrated circuit (ASIC), a field programmable gate array (FPGA) circuit, an integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. The transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122, (e.g., multiple antennas), for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station, (e.g., base stations 114a, 114b), and/or determine its location based on the timing of the signals being received from two or more nearby base stations. The WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
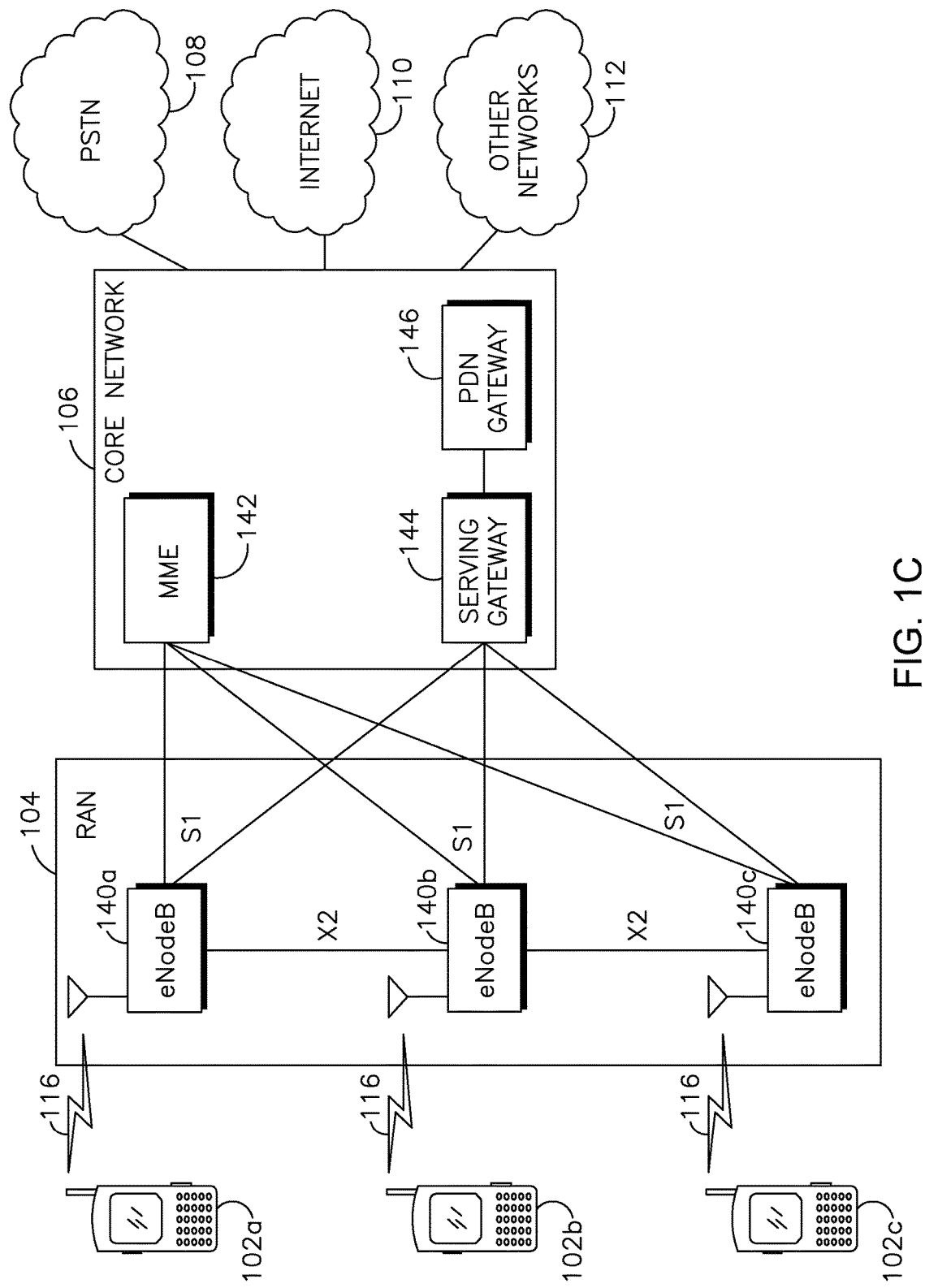
FIG. 1C shows an example radio access network and an example core network that may be used within the communications system shown in FIG. 1A.

FIG. 1C shows an example RAN 104 and an example core network 106 that may be used within the communications system 100 shown in FIG. 1A. As noted above, the RAN 104 may employ an E-UTRA radio technology to communicate with the WTRUs 102a, 102b, 102c over the air interface 116. The RAN 104 may also be in communication with the core network 106.

The RAN 104 may include eNBs 140a, 140b, 140c, though it will be appreciated that the RAN 104 may include any number of eNBs while remaining consistent with an embodiment. The eNBs 140a, 140b, 140c may each include one or more transceivers for communicating with the WTRUs 102a, 102b, 102c over the air interface 116. In one embodiment, the eNBs 140a, 140b, 140c may implement MIMO technology. Thus, the eNB 140a, for example, may use multiple antennas to transmit wireless signals to, and receive wireless signals from, the WTRU 102a.

Each of the eNBs 140a, 140b, 140c may be associated with a particular cell (not shown) and may be configured to handle radio resource management decisions, handover decisions, scheduling of users in the uplink and/or downlink, and the like. As shown in FIG. 1C, the eNBs 140a, 140b, 140c may communicate with one another over an X2 interface.

The core network 106 shown in FIG. 1C may include a mobility management entity (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNBs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNBs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNB handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway, (e.g., an IP multimedia subsystem (IMS) server), that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Some MTC devices may connect to the network only sporadically. A core network may be able to inform the MTC server when particular devices connect. However, no procedures have been defined that include an MTC interworking function (MTC-IWF) and the necessary home subscriber server (HSS) subscription fields, messaging on a Tsp interface, a T5a/b/c interface, as well the necessary modifications to non-access stratum (NAS) messaging between a serving node and a WTRU.

Many of the concepts described herein may relate to machine type communication (MTC) small data and device triggering enhancements.

A procedure is described herein for allowing a services capability server (SCS) to request a core network (CN) to perform a network initiated detach on a WTRU. This procedure may be used in the scenario where the SCS mows that the device may not be needed for a long time, or when the SCS detects some event that may warrant a detach, (theft, disallowed location, integrity validation failure, and the like).

An attach procedure is also described herein whereby a service node may request the SCS if a WTRU may be allowed to attach at this time. If the SCS indicates that the attach should be rejected, (because the WTRU is not needed at this time), the attach may be rejected and the WTRU may be requested to try again later, thus avoiding additional activity on the control and user planes.

A procedure is also described herein for informing the SCS that a WTRU is attached. The procedure includes the necessary HSS subscription fields, messaging on the Tsp interface and the T5a/b/c interface, as well the necessary modifications to the NAS messaging between the serving node and the WTRU.

Figure 2:
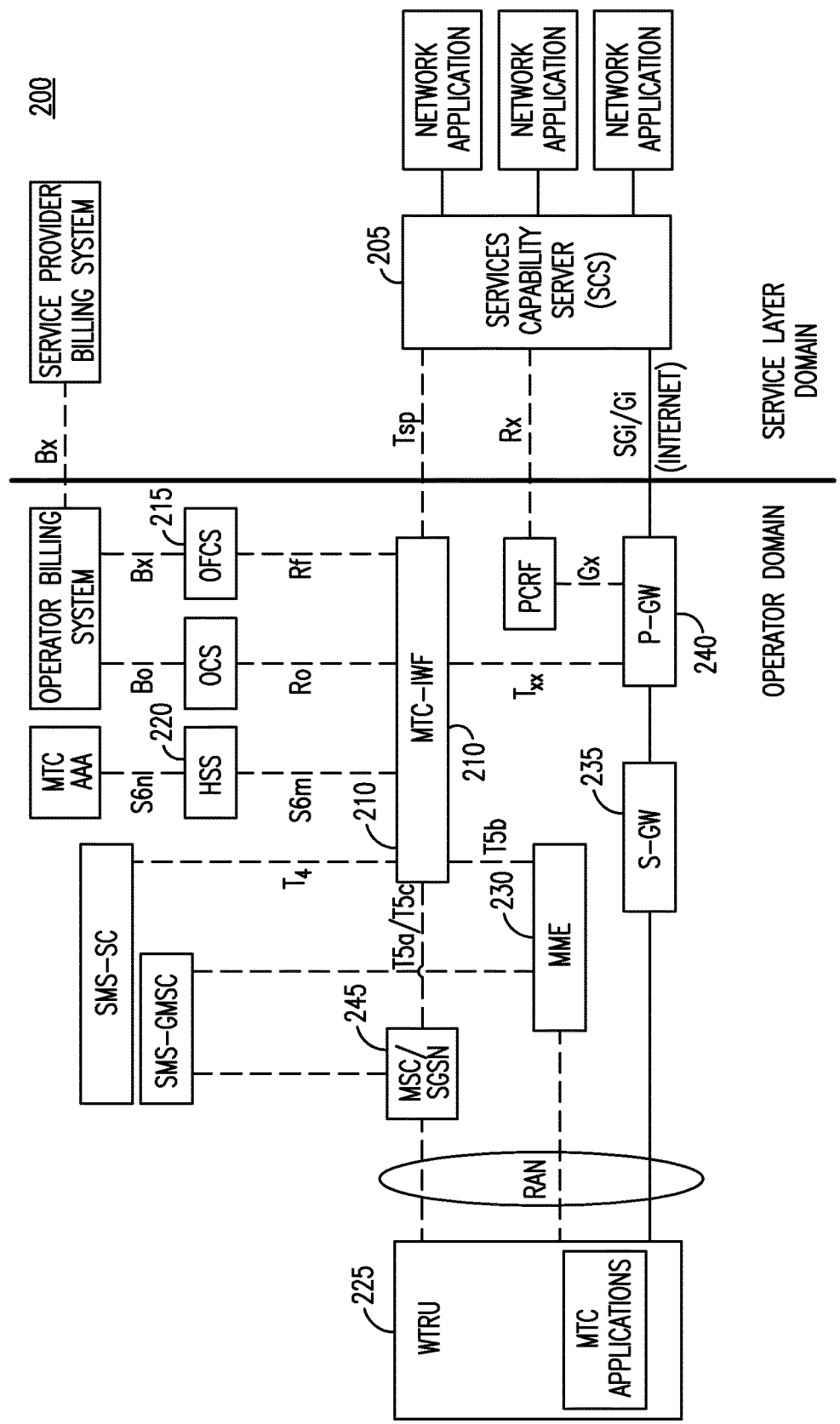
FIG. 2 is a block diagram of a third generation partnership project (3GPP) core network/service layer machine type communication (MTC) architecture.

FIG. 2 is a block diagram of a third generation partnership project (3GPP) core network/service layer MTC architecture 200. The MTC architecture 200 may include, for example, an SCS 205, an MTC-IFW 210, an offline charging system 215, an HSS 220, a WTRU 225, an MME 230, a serving gateway (S-GW) 235, a packet data network (PDN) gateway (P-GW) 240, and a mobile switching center (MSC)/serving general packet radio service (GPRS) support node (SGSN) 245. If the SCS 205 detects an event associated with the WTRU such as theft, roaming into an area that is not allowed, or an integrity validation failure, the SCS 205 may desire to force the WTRU 225 to detach from the network. If the SCS 205 determines that the WTRU is not going to be needed for a long period of time, the SCS 205 may desire to force the WTRU 225 to detach from the network and provide a time when the WTRU 225 may reattach to the network. The WTRU 225 may be programmed to periodically connect to the network and check in with the SCS 205 to determine if a particular task needs to be performed. Often, the SCS 205 may indicate to the WTRU 225 that there is no task to be performed. The WTRU may then return to a low power (e.g., idle) state. The WTRU 225 may establish a user plane communication to determine whether it is needed to perform a task.

Attach indications to the SCS 205 are described herein. If the subscriber information of WTRU 225 indicates that an SCS network attachment feature is supported, the serving node may check with the SCS 205 before allowing the WTRU 225 to attach. If the subscriber information of the WTRU 225 indicates that the SCS network attachment feature is supported, the MTC-IWF 210 may inform the SCS 205 whenever the WTRU 225 becomes reachable for triggering, which may occur when the WTRU 225 is attached to the circuit switched (CS) and/or packet switched (PS) domain. Each SCS 205 that is listed in the subscriber information of the WTRU 225 may be permitted to disable and enable its attach indications for the WTRU. The SCS 205 may not be aware of how the WTRU 225 is attached (PS or CS domain).

The SCS 205 may be limited in knowing that the WTRU 225 is triggerable. By informing the SCS 205 when the WTRU 225 becomes triggerable, the SCS 205 may know what WTRUs are available in the network, thus reducing the number of times that the SCS 205 may need to check on the availability of the WTRUs and/or make unsuccessful trigger attempts. This SCS network attachment feature may be useful for WTRUs that shut down for long periods of time and wake up sporadically to report data or events.

The core network may monitor WTRUs for specific events and notify the SCS 205 when those events occur, (e.g., change in the point of attachment, loss of connectivity, and the like). The core network may monitor WTRUs for attach events.

Subscription information fields used to support the SCS network attachment feature may include a permitted service capability servers field to indicate the names of the SCSs that this the WTRU is allowed to connect to. The subscription information fields may further include a reachable indications enabled field having a flag that may be used to indicate if the SCS may be informed when the WTRU becomes reachable for triggering. The subscription information fields may also include an attachment block enabled field having a flag that may be used to indicate if the SCS may be informed when the WTRU attempts to attach and may be allowed to deny the attach attempt. Additionally, the subscription information fields may include an MTC-IWF address field that may be used to contact the SCS.

In order to inform the SCS that a WTRU has become reachable for triggering, the following modifications may be made to the mobile switching center (MSC), serving general packet radio service (GPRS) support node (SGSN) and MME.

When a WTRU attaches to an SGSN and the attach type is not "GPRS attach while already international mobile subscriber identity (IMSI) attach", the SGSN may send a message to the SCS (via the MTC-IWF) indicating that the device is triggerable. When a WTRU attaches to an MME, the MME may send a message to the SCS (via the MTC-IWF) indicating that the device is triggerable. Whenever a WTRU performs a CS domain location update and the update type is "IMIS attach" or "normal location update", the MSC may send a message to the SCS (via the MTC-IWF) indicating that the device is triggerable.

The "IMSI attach" type may be used when a WTRU powers on in the same location area. The "normal location update" type may be used when a WTRU powers on in a new location area or when a WTRU roams into a new location area. If a WTRU roams into a location area that is served by a new MSC, the new MSC may have no way of knowing if the location update is from a roaming WTRU or a WTRU that was just powered on. Thus, the SCS may be informed every time the WTRU performs a location update and the update type is "IMSI attach" and every time the WTRU performs "normal location update" with a new MSC.

For SCS initiated detach, if the WTRU's subscriber information indicates that the SCS network attachment feature is supported, the SCS may be able to request that the WTRU detach from the network, (due to time of day restrictions, location (routing area) restrictions, congestion, or other service layer subscription settings). This SCS network attachment feature may reduce WTRU power consumption and reduce the use of network resources. The SCS may be able to provide a detach cause and a backoff timer to the WTRU, so that the WTRU knows when it may reattempt to attach again. The core network may monitor WTRUs for specific events and notify the SCS when those events occur so that, for example, the SCS may respond to an event that was observed by the core network.

Subscription information fields used to support these features may include a permitted SCS field including the name of the SCS that is associated with the WTRU, and a permitted for SCS initiated detach field including an indicator that is used to determine if the SCS is permitted to detach the device.

In order to allow the SCS to detach a device, the SCS may issue the detach request to the MTC-IWF. The detach request may include a backoff-time and/or an action-cause. The MTC-IWF may find the device serving node(s) and make the detach request to the serving node(s) on behalf of the SCS.

MME behavior for SCS initiated detach is described herein. When a message is received from the MTC-IWF, the MME may decide if the request may map to a "re-attach required" detach or a "re-attach not required" detach.

A "re-attach required" detach may be selected if the message provided a backoff-time or if the action-cause is unspecified, access-not-permitted-at-this-time, data-limit-reached, or SCS-congested. A "re-attach not required" detach may be selected if the message did not provide a backoff-time or if the action-cause is device-service-layer-subscription-not-valid, integrity-validation-failure, location-not-allowed.

The action-cause provided in the message may be mapped to the evolved packet system (EPS) mobility management (EMM) cause field in the DETACH_REQUEST (WTRU terminated) message.

FIG. 3 shows mobility management entity (MME) mapping of action-cause to additional update result for a T5 detach request. The MME may choose to perform a combined detach if the SCS indicated a backoff time that the WTRU may use to determine when to re-attach, or the MME may choose to keep the WTRU IMSI attached so that it may receive triggers in the CS domain.

If a device attempts to attach to the MME, and the MME has no T5b interface to the MTC-IWF that is associated with the device's SCS, then the MME may choose to allow the device to connect so that the WTRU application may initiate communication with the SCS over the user plane. The MME may accept the attach and include the "additional network feature support" information element (IE) in the accept message to indicate that the MME's SCS connection is not successful.

If a WTRU attempts to attach to the MME, and the MME has no T5b interface to the MTC-IWF that is associated with the WTRU's SCS, then the MME may choose to reject the attach attempt and indicate to the WTRU that the connection is being rejected because the MTC-IWF/SCS is not reachable to the MME, (the EMM-CAUSE IE="requested service option not authorized in this public land mobile network (PLMN)").

SGSN behavior for an SCS initiated detach may be identical to that of an MME. If a device attempts to attach to the SGSN, and the SGSN has no T5a interface to the MTC-IWF that is associated with the device's SCS, then the SGSN may choose to allow the device to connect so that the WTRU application may initiate communication with the SCS over the user plane. The SGSN may accept the information and include the "additional network feature support" IE in the accept message to indicate that the SGSN's SCS connection is not successful. If a device attempts to attach to the SGSN, and the SGSN has no T5a interface to the MTC-IWF that is associated with the device's SCS, then the SGSN may choose to reject the attach attempt and indicate to the WTRU that the connection is being rejected because the MTC-IWF/SCS is reachable to the SGSN, (the global multimedia mobility (GMM) CAUSE IE="not authorized for this closed subscriber group (CSG)").

When a DETACH_REQUEST (WTRU terminated) message is received from the MME or SGSN, the message may include the SCS backoff timer, and the detach type may be "re-attach required", the WTRU may set a timer to the value indicated by the SCS backoff timer field and not attempt a reattach until the timer expires.

Permanent subscriber data is data that may only be changed by administration means. Temporary subscriber data is data which may change as a result of normal operation of the system.

The following fields may be added to the subscriber database in the HSS to support MTC WTRUs. A permitted service capability servers field is a list of external identifiers indicating which SCS's are allowed to perform operations on this device via the MTC-IWF. A reachable indicators enabled field may be included in the subscription for each permitted SCS. This field may indicate if the serving node may inform the SCS when the device becomes reachable for triggering. This information is temporary subscriber data.

For each permitted SCS, the subscription may include an attachment block enabled field. This field may indicate if the serving node may check with the SCS before allowing the device to attach. The information is temporary subscriber data.

Furthermore, for each permitted SCS, the subscription may include a MTC-IWF name field. This field may indicate the name of an MTC-IWF that may be used to contact the permitted SCS. This information is temporary subscriber data.

In addition, for each permitted SCS, the subscription may include a permitted for SCS initiated detach field. This field may indicate if the SCS is allowed to initiate a device detach. This information is permanent subscriber data.

Figure 4:
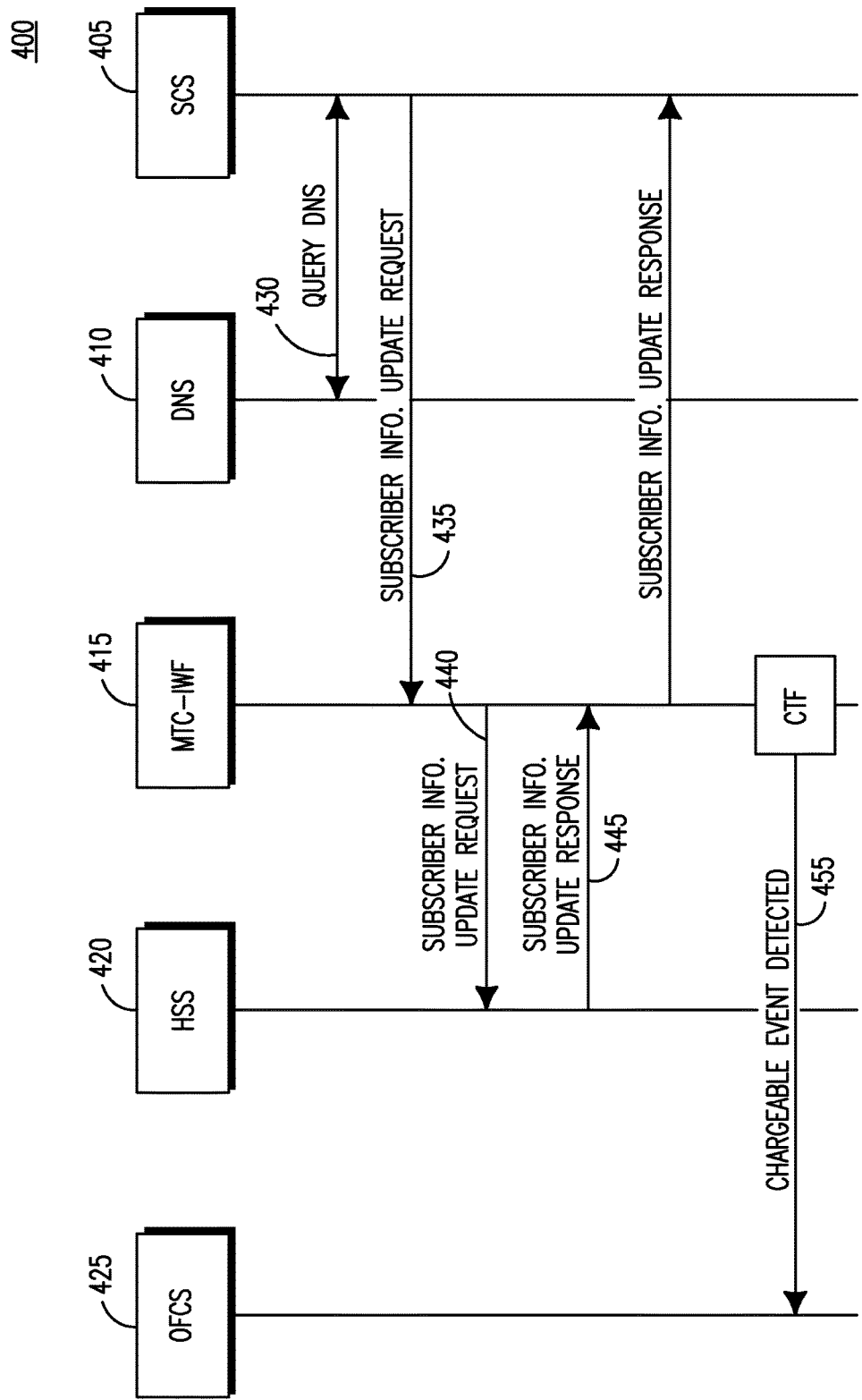
FIG. 4 shows signal flow of a procedure used by a services capability server (SCS) to modify subscription information for a WTRU.

FIG. 4 shows signal flow of a procedure 400 used by a services capability server (SCS) to modify subscription information for a WTRU. The procedure 400 may be implemented in a network including an SCS 405, a domain name system (DNS) 410, an MTC-IWF 415, an HSS 420 and an offline charging system (OFCS) 425.

As shown in FIG. 4, the procedure 400 may be used by the SCS 405 to enable and disable attach indications to the SCS 405. This may be controlled by the previously described reachable indicators enabled field in the HSS 420. The procedure 400 may be used if the SCS 405 does not desire to receive attachment notifications for a particular WTRU.

The SCS 405 may determine the need to update the subscriber information for a WTRU. If the SCS 405 has no contact details for an MTC-IWF 415, it may determine the Internet protocol (IP) address(es)/port(s) of the MTC-IWF 415 by querying the DNS 410 using an external identifier of a WTRU to be triggered (430 of procedure 400). The SCS 405 may send a subscriber information update request message 435 to the MTC-IWF 415. The subscriber information update request 435 may include the WTRU's external identifier and indicate the feature to be enabled or disabled. The MTC-IWF 415 may forward a subscriber information update request message 440 to the HSS 420. The HSS 420 may check if the SCS 405 is authorized to perform the requested operation and respond to the MTC-IWF 415 with a subscriber information update response message 445. The subscriber information update response message 445 may indicate if the operation is successful or not. The MTC-IWF 415 may forward a subscriber information update response message 450 to the SCS 405. The subscriber information update response message 450 may indicate if the operation is successful or not. On a condition that the successful operation is chargeable, then a charging trigger function (CTF) in the MTC-IWF 415 may forward charging information 455 indicating that a chargeable event was detected to the OFCS 425. The mobile network operator (MNO) policy may be used to determine which subscription modification requests are chargeable.

Figure 5:
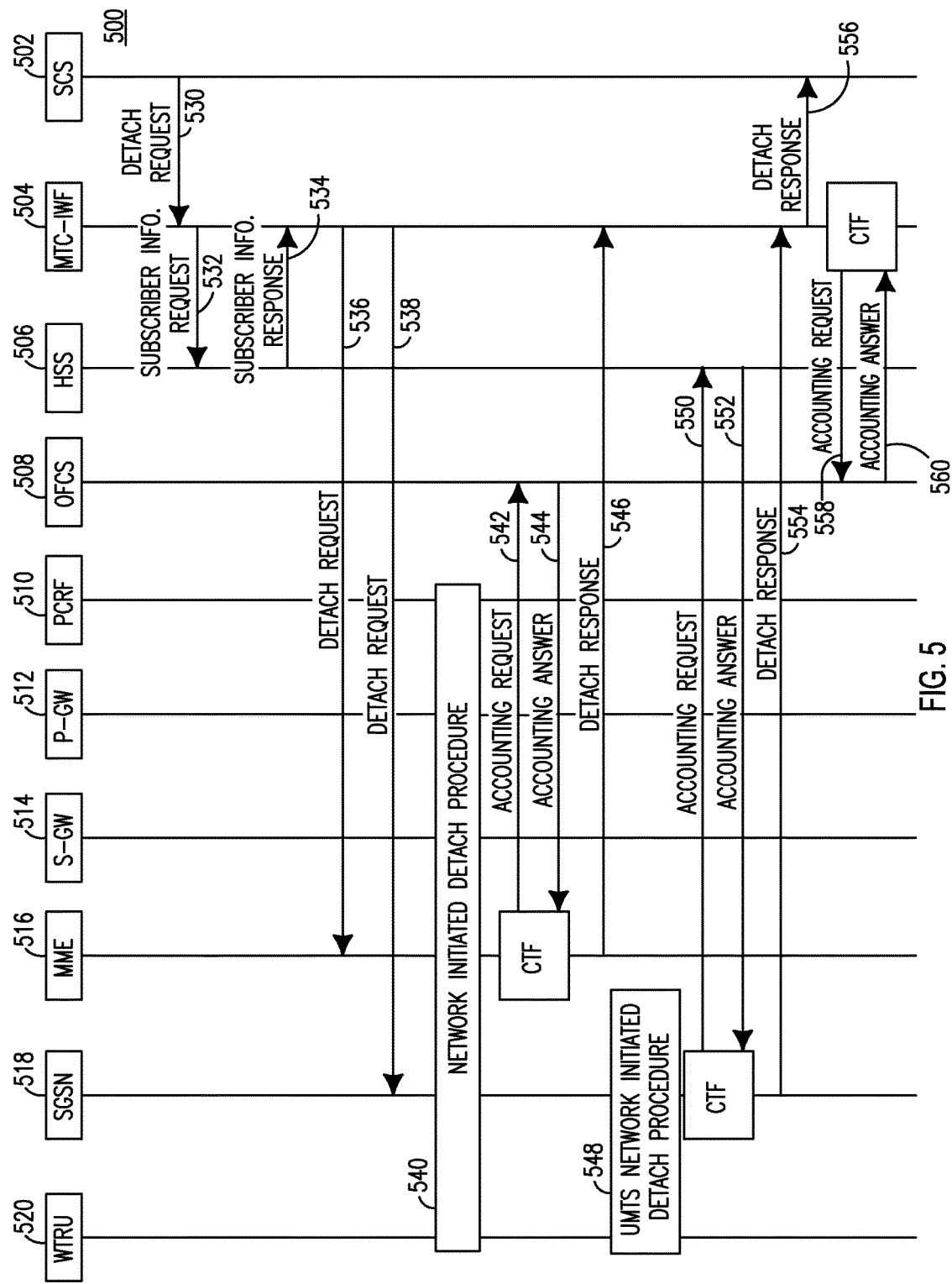
FIG. 5 shows signal flow of an SCS initiated detach procedure.

FIG. 5 shows signal flow of an SCS initiated detach procedure 500. The procedure 500 of FIG. 5 may be implemented in a network including an SCS 502, an MTC-IFW 504, an HSS 506, an OFCS 508, a PCRF 510, a P-GW 512, an S-GW 514, an MME 516, an SGSN 518 and a WTRU 520. When the SCS 502 requests that the WTRU 520 detach, the MTC-IWF 504 may check with the HSS 506 to determine if the SCS 502 is authorized to detach the WTRU 520 and then request that at least one of the serving nodes initiate a detach of the WTRU 520.

Referring to FIG. 5, the SCS 502 may send a detach request message 530 to the MTC-IWF 504 requesting that the WTRU 520 be detached from the network. The detach request message 530 may be sent over a Tsp reference point (device action request (DAR) command, action-type=device detach request), as shown in FIG. 2. The detach request message 530 may include an SCS identifier, the external identifier of the WTRU to be attached, a detach cause, and a backoff time. The MTC-IWF 504 may send a subscriber information request message 532 to the HSS 506 to translate the external identifier of WTRU 520 to an IMSI, to check if the SCS 502 is authorized to detach the WTRU 520, and to find the WTRU's serving node(s). The subscriber information request message 532 may be sent on the S6m reference point shown in FIG. 2, and may include an SCS identifier, the external identifier of the WTRU, and an indication of the service that is requested by the SCS. The service indication may be provided in the service-ID AVP, which may be=SCS_INITIATED DETACH.

The HSS 506 may check if the "permitted for SCS initiated detach" field may be enabled for the SCS 502. The HSS 506 may send a subscriber information response message 534 to the MTC-IWF 504 with an indication of whether or not the operation may be permitted. If sending the detach request message 536 is permitted, the HSS 506 may provide the MTC-IWF 504 with the serving node address(es), (e.g., the address/name of an MME or SGSN or MSC that needs to be contacted to detach the WTRU 520).

If the HSS 506 provided an MME address, the MTC-IWF 504 may send a detach request message 536 to the MME 516. The detach request message 536 may be sent over the T5b reference point (DAR command) shown in FIG. 2. The detach request message 536 may include a cause and a backoff time. If the HSS 506 provided an SGSN address, the MTC-IWF 504 may send a detach request message 538 to the SGSN 518. The detach request message 538 may be sent over the T5a/T5c reference point (DAR command) shown in FIG. 2. The detach request message 538 may include a cause and a backoff time.

After receiving the detach request message 536 or 538, the MME 516 or the SGSN 518 may initiate a network initiated detach procedure 540. The MME 516 or the SGSN 518 may select the detach type. The choice of a "re-attach required" or "re-attach not required" may be based on the action-cause value that was provided in the detach request. If the chosen detach type is "re-attach required", then the backoff time may be provided in the detach request message 536 or 538 to the WTRU 520.

A CTF in the MME 516 may send an accounting request message 542, including charging information for detaching the WTRU 520, to the OFCS 508. The accounting request message 542 may be sent on the Rf reference point shown in FIG. 2, which may use the diameter protocol. Although not shown in FIG. 2, there may be an Rf interface from the MME 230 to the OFCS 215. An ACR message may be used. The subscription-ID AVP may be set to the MSISDN, IMSI, or external ID of the WTRU. The subscription-ID AVP may be fully defined by the subscription-ID-type and subscription-ID-data AVPs. The subscription-ID-type AVP may be updated to support the external ID. The service-information AVP may be updated to include the MTC-information AVP, which may indicate that the provided service was an SCS initiated detach.

The OFCS 508 may respond to the CTF of the MME 516 by sending an accounting answer message 544 with an indication as to whether the charging information has been recorded. The accounting answer message 544 may be sent on the Rf reference point shown in FIG. 2, which may use the diameter protocol. The ACA message may be used.

The MME 516 may send a detach response message 546 indicating to the MTC-IWF 504 when the detach is complete. The detach response message 546 may be sent over the T5b reference point shown in FIG. 2, (device action answer (DAA) command).

After receiving the detach request message 538, the SGSN 518 may initiate a network initiated detach procedure 548. A CTF in the SGSN 518 may send an accounting request message 550, including charging information for detaching the WTRU 520, to the OFCS, which may be sent on the Rf reference point as shown in FIG. 2, which may use the diameter protocol. Although not shown in FIG. 2, there may be an Rf interface from the SGSN 245 to the OFCS 215. An ACR message may be used. The subscription-ID AVP may be set to the MSISDN, IMSI, or external ID of the WTRU 520. The subscription-ID AVP may be fully defined by the subscription-ID-type and subscription-ID-data AVPs. The subscription-ID-type AVP may be updated to support the external ID. The service-information AVP may be updated to include the MTC-information AVP, which may indicate that the provided service was an SCS initiated detach. The OFCS 508 may respond to the CTF in the SGSN 518 with an accounting answer message 552 indicating whether the charging information has been recorded. The accounting answer message 552 may be sent on the Rf reference point, which may use the diameter protocol. An ACA message may be used.

The SGSN 518 may send a detach response message 554 to the MTC-IWF 504 when the detach is complete. This detach response message 554 may be sent over the T5a/T5c reference point, (DAA command), as shown in FIG. 2.

The MTC-IWF 504 may send a detach response message 556 to the SCS 502, (DAA command). If the detach request was not authorized by the MTC-IWF 504 after sending the subscriber information response 534, then the DAA command may be issued after sending the subscriber information response 534.

The CTF in the MTC-IWF 504 may send an accounting request message to the OFCS 508 to generate charging information for requesting the detaching. The message may be sent on the Rf reference point, which may use the diameter protocol. An ACR message may be used. In response, the OFCS 508 may send an accounting answer message 560 to the CTF in the MTC-IWF 504 with an indication as to whether the charging information has been recorded. The message may be sent on the Rf reference point, which may use the diameter protocol. An ACA message may be used.

The subscription-ID AVP may be set to the MSISDN, IMSI, or external ID of the WTRU 520. The subscription-ID AVP may be fully defined by the subscription-ID-type and subscription-ID-data AVPs. The subscription-ID-type AVP may be updated to support the external ID. The service-information AVP may be updated to include the MTC-information AVP, which may indicate that the provided service was an SCS initiated detach.

FIGS. 6A-6D show signal flow of a network-assisted attach to SCS procedure 600 for LTE. The procedure 600 may be based on an evolved UMTS terrestrial radio access network (E-UTRAN) attach procedure. The procedure 600 of FIG. 7 may be implemented in a network including an SCS 602, an MTC-IFW 604, an OFCS 606, an HSS 608, a policy charging and rules function (PCRF) 610, a P-GW 612, an S-GW 614, an old MME/SGSN 616, a new MME/SGSN 618, an eNB 620 and a WTRU 622.

Figure 6A:
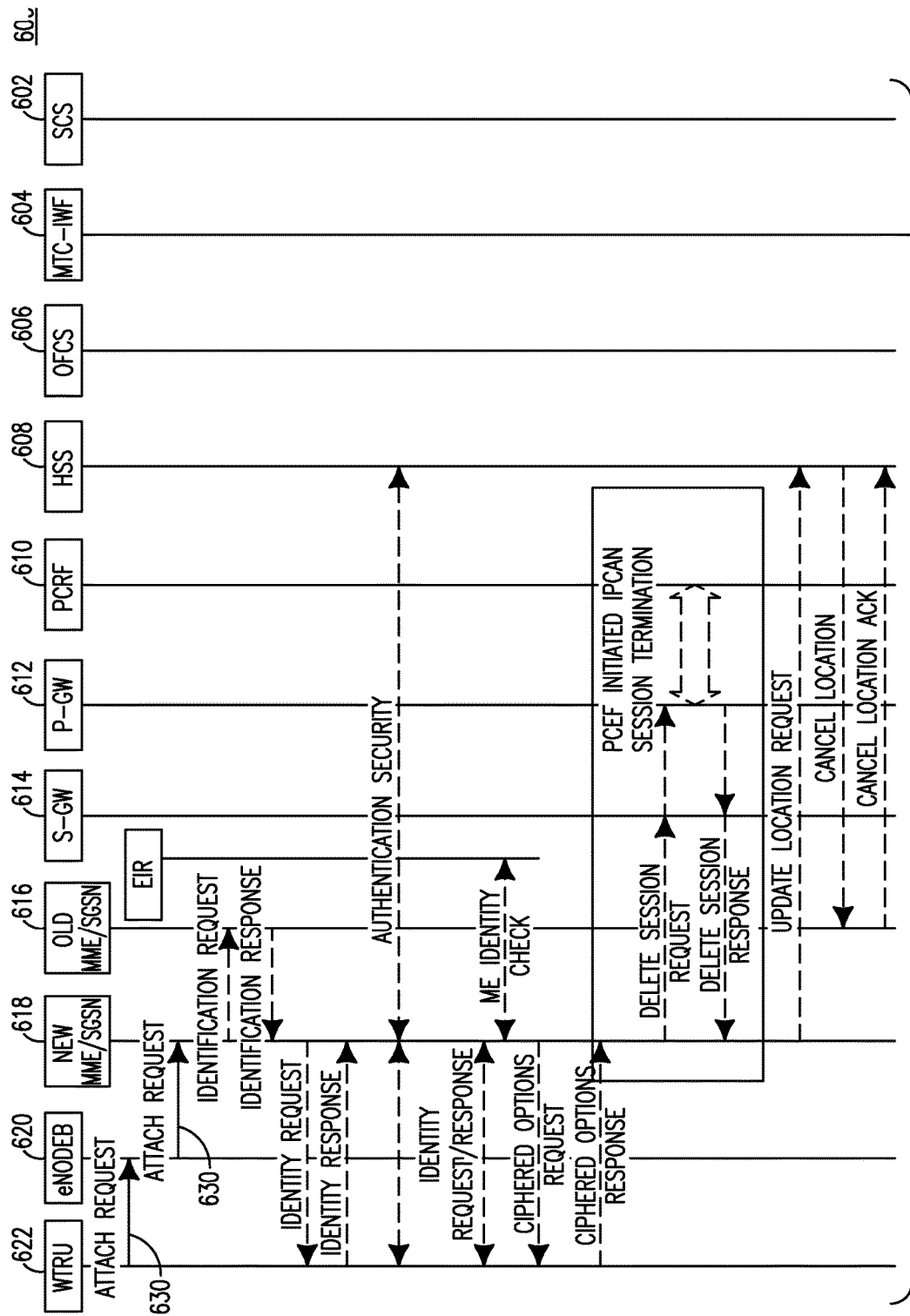

As shown in FIG. 6A, the WTRU 622 may send an attach request message 630 to the eNB 620, which may in turn forward the attach request message 630 to the new MME/SGSN 618. The procedure 600 may then implements an identity and security procedure.

As shown in FIG. 6B, the HSS 608 may send an attachment (update location) acknowledgement (ACK) and subscriber information message 632 to the new MME/SGSN 618 identifying at least one of the MTC-IFW 604 and the SCS 602. The subscriber information message 632 may be used to send subscription information from the HSS 608 to the new MME/SGSN 618. In order to support this feature, new subscriber data fields may be implemented in the message 632, such as an "attachment block enabled" data field and a "reachable indicators enabled" data field.

If an "attachment block enabled" flag is enabled, the new MME/SGSN 618 may then use the T5b reference point to send an attach request message 634 (device permission request (DPR) command, action-type=device attach request, external-ID, SCS-identifier) to the MTC-IWF 604 identified by the attachment ACK and subscriber information message 632, which in turn may use the Tsp reference point to forward the attach request message 634 (DPR command, action-type=device detach request, external-ID) to the SCS 602. The SCS 602 may use the Tsp reference point to send an attach request response message 636 to the MTC-IWF 604 to indicate if the SCS 602 authorizes the attachment of the WTRU 622. The SCS may use the T5b reference point to forward the attach request response message 636 to the new MME/SGSN 618. Thus, the purpose of message 634 may be to inquire whether the WTRU 622 may be allowed to attach by the SCS 602, or if the SCS 602 desires that the attach be rejected. If the SCS 602 indicates in message 636 (device permission answer (DPA) command) that the WTRU 622 may not be allowed to attach, it may provide a cause and a backoff time to the MTC-IWF 604. The MTC-IWF 604 may forward to the new MME/SGSN 618 an indication of whether or not the SCS 602 the WTRU 622 is allowed to attach. If the SCS 602 indicates that the WTRU 622 does not need to be attached at this time, the MTC-IWF 604 may provide the cause and a backoff time to the new MME/SGSN 618 in the message 636 sent over the T5b reference point, (device permission answer (DPA) command).

A CTF in the new MME/SGSN 618 may send charging information in an accounting request (ACR) message 638 to the OFCS 606 for requesting if the WTRU 622 may be attached. The ACR message 638 may be sent on an Rf reference point, which may use the diameter protocol. The subscription-ID AVP may be set to the MSISDN, IMSI, or external ID of the device. The subscription-ID AVP may be fully defined by the subscription-ID-type and subscription-ID-data AVPs. The subscription-ID-type AVP may be updated to support the external ID. The service-information AVP may be updated to include the MTC-information AVP, which may indicate that the provided service was an attach permission request.

The OFCS 606 may respond with an accounting answer (ACA) message 640 indicating whether the charging information has been recorded. The ACA message 640 may be sent on the Rf reference point, which may use the diameter protocol.

A CTF in the MTC-IWF 604 may send charging information in an ACR message 642 to the OFCS 606 for requesting that the WTRU 622 be attached. The ACR message 642 may be sent on the Rf reference point, which may use the diameter protocol. The subscription-ID AVP may be set to the MSISDN, IMSI, or external ID of the WTRU 622. The subscription-ID AVP may be fully defined by the subscription-ID-type and subscription-ID-data AVPs.

The subscription-ID-type AVP may be updated to support the external ID. The service-information AVP may be updated to include the MTC-information AVP, which may indicate that the provided service was an attach permission request.

The OFCS 606 may respond to the CTF in the MTC-IFW 604 with an ACA message 644 indicating if the charging information has been recorded. The ACA message 644 may be sent on the Rf reference point, which may use the diameter protocol. The charging information that is included in the ACR message 642 and ACA message 644 may essentially be the same. However, both the new MME/SGSN 618 and the MTC-IWF 604 may generate charging information to account for the case where the WTRU 622 is roaming and the new MME/SGSN 618 belongs to the visited network. In the roaming case, the new MME/SGSN 618 and the MTC-IWF 604 may be connected to different OFCS's.

Figure 6C:
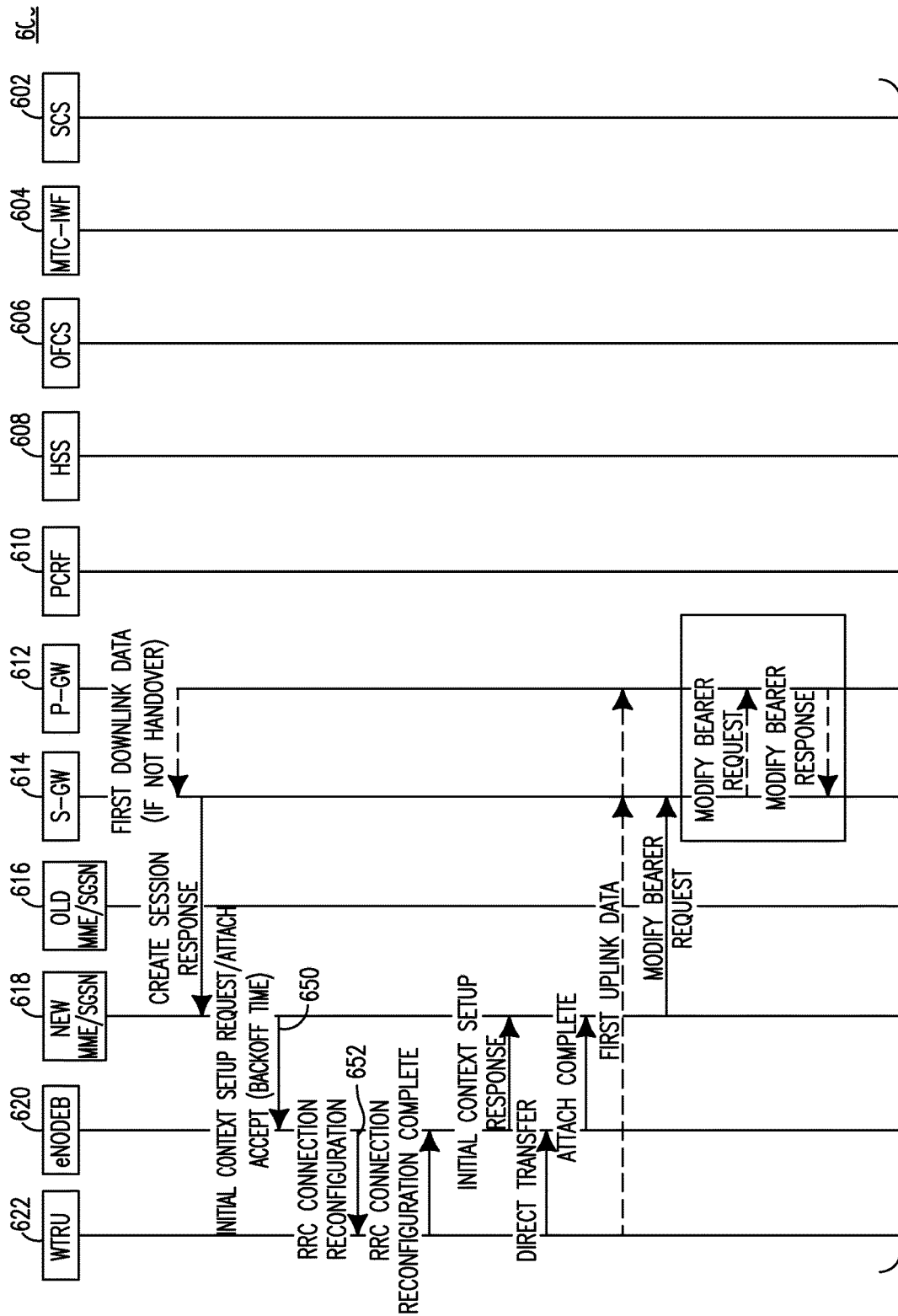

As shown in FIG. 6C, the new MME/SGSN 618 may send an initial context setup request/attach accept message 650 to the eNB 620, which in turn may send an RRC connection reconfiguration message 652 to the WTRU 622. When the SCS 602 indicates in an attach request response message 636 that the WTRU 622 is not allowed to attach, the initial context setup request/attach accept message 650 and the RRC connection reconfiguration message 652 may include a field indicating a backoff time, determined by the SCS 602, indicating when the WTRU 622 may reattempt to attach.

The message 650 may be either an ATTACH_ACCEPT message or an ATTACH_REJECT message sent by the new MME/SGSN 618. If the SCS 602 indicates that it desires the device to be triggerable, then the attach may be accepted. If the SCS 602 indicates that it does not need the device to be triggerable at this time, then the new MME/SGSN 618 may choose to accept the attach and include an indication in the ATTACH_ACCEPT message to indicate that the SCS 602 does not need the device to be triggerable, and include the SCS cause and backoff time to the WTRU 622. Alternatively, the new MME/SGSN 618 may choose to reject the location update and include an indication in the ATTACH_REJECT message to indicate that the rejection was caused by the SCS 602, and include the SCS cause and backoff time to the WTRU 622. The decision to accept or reject the attach when the SCS 602 does not require the device to be triggerable may be based on operator policy.

Figure 6D:
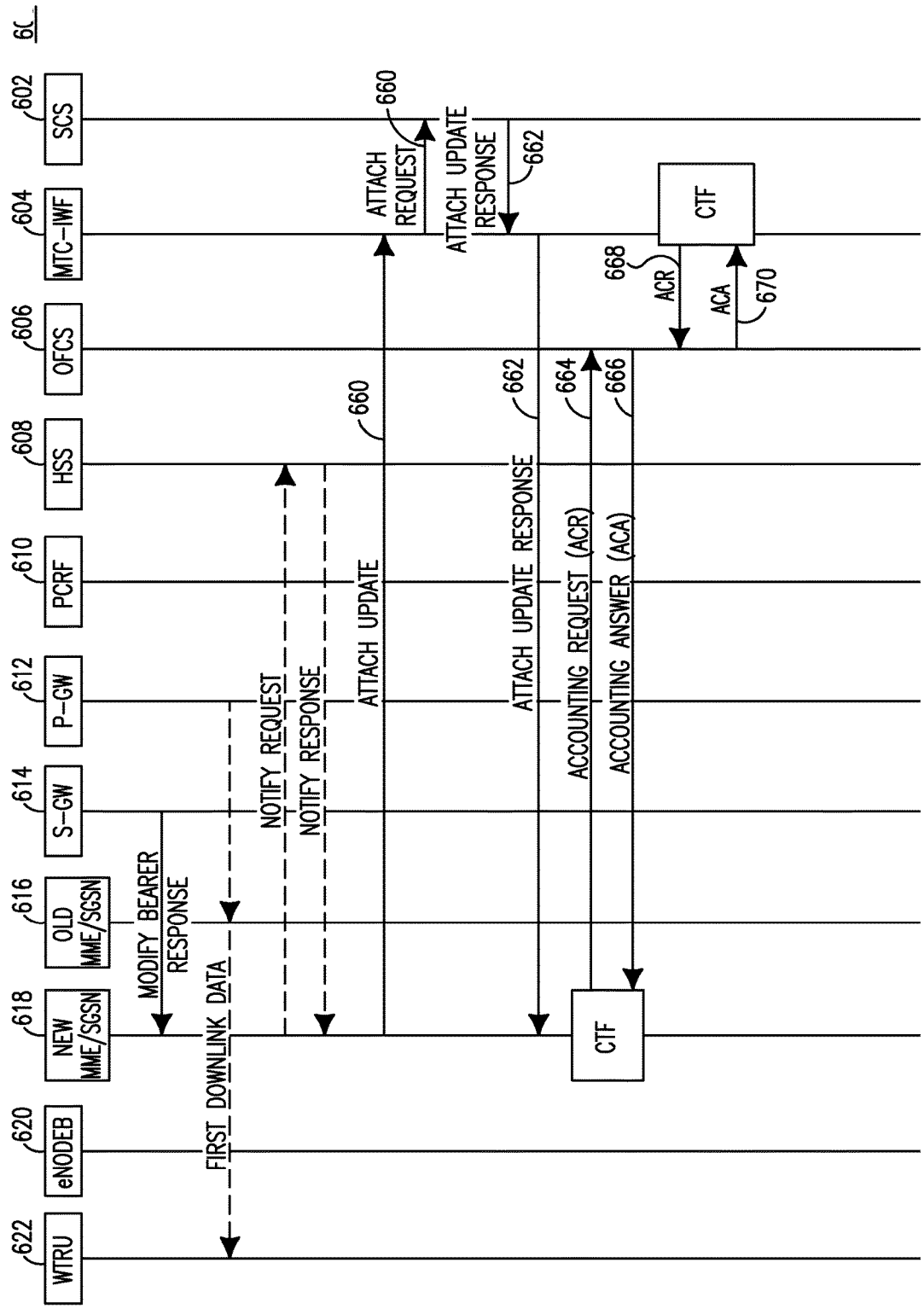

As shown in FIG. 6D, the new MME/SGSN 618 may send an attach update message 660 to the MTC-IFW 604, which forwards the attach update message 660 to the SCS 602 indicating that the WTRU 622 has attached and that the SCS 602 may now communicate with the WTRU 622. The SCS 602 may then send an attach update response message 662 to the MTC-IFW 604, which may forward the attach update response message 662 to the new MME/SGSN 618.

If the "reachable indicators enabled" flag in message 632 is enabled, then the new MME/SGSN 618 may send the (DNR command, action-type=device attach event, external-ID, SCS-identifier) message 660 to the MTC-IWF address that was provided in the subscriber data. This message 660 may be sent over the T5b reference point to inform the SCS 602 that the WTRU 622 has attached.

The MTC-IWF 604 may forward the message 660 to the SCS 602 over the Tsp reference point, (DNR command, action-type=device attach event, external-ID), and the SCS 602 may acknowledge the notification (DNA command) by sending an attach update response message 662. The MTC-IWF 604 may forward the attach update response message 662 to the new MME/SGSN 618 over the T5b reference point (DNA command).

The new MME/SGSN 618 may generate charging information by sending an ACR message 664 as an attach notification on the Rf reference point, which may use the diameter protocol. The Subscription-ID AVP may be set to the MSISDN, IMSI, or external ID of the WTRU 622. The subscription-ID AVP may be fully defined by the subscription-ID-type and subscription-ID-data AVPs. The subscription-ID-type AVP may be updated to support the external ID. The service-information AVP may be updated to include the MTC-information AVP, which may indicate that the provided service was an attach notification.

The OFCS 606 may respond with an ACA message 666 indication if the charging information has been recorded. An ACA message 666 may be sent on the Rf reference point, which may use the diameter protocol.

A CTF in the MTC-IWF 604 may generate charging information in an ACR message 668 for requesting the attach notification on the Rf reference point, which may use the diameter protocol. The Subscription-ID AVP may be set to the MSISDN, IMSI, or external ID of the device. The subscription-ID AVP may be fully defined by the subscription-ID-type and subscription-ID-data AVPs. The subscription-ID-type AVP may be updated to support the external ID. The service-information AVP may be updated to include the MTC-information AVP, which may indicate that the provided service was an attach notification.

The OFCS 606 may respond with an ACA message 670 including an indication if the charging information has been recorded. The ACA message 670 may be sent on the Rf reference point, which may use the diameter protocol. The charging information that is generated by the ACR message 668 and ACA message 670 may essentially be the same. However, both the new MME/SGSN 618 and the MTC-IWF 604 may generate charging information to account for the case where the WTRU 618 is roaming and the new MME/SGSN 618 belongs to the visited network. In the roaming case, the new MME/SGSN 618 and the MTC-IWF 604 may be connected to different OFCS's.

Several different Tsp commands may be sent over a Tsp interface. A device action request (DAR) command may be an existing command that is modified to be used by the SCS 602 to request the MTC-IWF 604 to detach the WTRU 622. A device action answer (DAA) command may be an existing command that may be modified to be used by the MTC-IWF 604 if the detach request was successful. A device notification request (DNR) command may be an existing command that may be modified to be used by the MTC-IWF 604 to indicate to the SCS 602 that a device has attached. A device notification answer (DNA) command may be an existing command that may be modified to be used by SCS 603 to acknowledge an attach indication from the MTC-IWF 604.

A device permission request (DPR) command may be indicated by a new command code field value and the 'R' bit set in the command flags field. The DPR command may be sent by the MTC-IWF 604 to the SCS 602 as part of a device permission request procedure. The DPR command may be used to check if a device is permitted to perform some action. The DPR command may be used to determine if a device is allowed to attach.

A device permission answer (DPA) command may be indicated by a new command code field value and the 'R' bit cleared in the command flags field. The DPA command may be sent by the SCS to the MTC-IWF as part of the device permission request procedure. The DPA command may be used to indicate if the device may be allowed to perform some action.

Tsp AVPs may include an action type AVP. This may be an existing AVP. New encoding may be added. This AVP may be used on the Tsp, T5a, T5b and T5c reference points. The action type AVP may be of type enumerated, and may inform the MTC-IWF of what action type is required in the request and also informs the SCS of what action type is reported.

The following values are defined.

A device trigger request (1) value may indicate a device trigger request and may be used in the device action AVP of the device action request command or in the device notification AVP of the device action answer command.

A delivery report (2) value may indicate a delivery report sent from MTC-IWF to the SCS and may be used in the device notification AVP of the device notification request command.

A device detach request (3) value may indicate a device detach request and may be used in the device action AVP of the device action request command or in the device notification AVP of the device action answer command.

A device attach request (4) value may indicate that a device is attempting to attach.

A device detach event (5) value may indicate a device has detached.

A device attach event (6) value may indicate a device has attached.

An action cause AVP may be a new AVP that is used to indicate why the SCS is requesting a device to detach or reject an attach. This AVP may be used on the Tsp, T5a, T5b and T5c reference points. The action cause AVP may be of type enumerated, and may inform the MTC-IWF why the SCS is making the request. The following values are defined.

An unspecified (1) value.

A device service layer subscription not valid (2) value may indicate that the device's service layer subscription is no longer valid.

An integrity validation failure (3) value may indicate that the device failed a service layer integrity check.

A location not allowed (4) value may indicate that the service layer has detected that the device is in a location that is not allowed.

An access not permitted at this time (5) value may indicate that the device is not permitted to access the service layer at this time. This response may be accompanied by a backoff time to indicate when the device is allowed to access the service layer.

A data limit reached (6) value may indicate that the device has reached some limit with respect to its service layer accesses. This response may be accompanied by a backoff time to indicate when the device may try to access the service layer again.

An SCS congested (7) value may indicate that the service layer is congested. This response may be accompanied by a backoff time to indicate when the device may try to access the service layer again.

A backoff time AVP may be a new AVP that is used to indicate how long a WTRU may wait before trying to attach again. This may be used on the Tsp, T5a, T5b, and T5c reference points. The backoff time AVP may be of type unsigned32 and may indicate the backoff time in seconds.

The S6m/S6n protocol may be changed to support new features. S6m AVPs include a service ID AVP that may be given a new encoding. The new encoding may used by the MTC-IWF to indicate to the HSS that the SCS is requesting to detach the device. The HSS may either authorize the detach and provide the MTC-IWF with the information that it needs to complete the detach procedure or it may inform the MTC-IWF that the device is not authorized.

The service-ID AVP may be of type enumerated and it may identify the service requested by the SCS. The following values are defined.

The DEVICE_TRIGGER (0) value may be used by the SCS to request a control plane device triggering to the WTRU.

A SCS_INITIATED_DETACH (1) value may be used by the SCS to request that the device be detached.

Commands for the T5a/T5b interface may include a device action request command sent by the MTC-IWF to the serving node (SGSN/MME) in order to request some device action on behalf of the SCS, such as a detach. A device action answer command may be sent by the serving node (SGSN/MME) to the MTC-IWF in order to request some device action on behalf of the SCS, such as a detach. A device notification request command may be sent by the serving node (SGSN/MME) to the MTC-IWF in order to notify the SCS of some event such as a device attach or detach. A device notification answer command may be sent by the MTC-IWF to the serving node (SGSN/MME) in order to acknowledge to the serving node (SGSN/MME) that the device notification request command was received. A device permission request command may be sent by the MTC-IWF to the SCS to check if the device is permitted to perform some action. A device permission answer command may be sent by the SCS to the MTC-IWF to inform the MTC-IWF if the device is permitted to perform some action.

Various layer 3 messaging updates are described herein.

The following messages are CS domain mobility management messages.

FIG. 7 shows location updating accept message content 700. The LOCATION_UPDATING_ACCEPT message may be an existing message sent by the network to the mobile station to indicate that updating or IMSI attach in the network has been completed. As shown in FIG. 7, a reject cause IE 705 may be added to this message to account for the case where the network accepts the attach, but the SCS requested that the attach not be accepted. An SCS backoff timer IE 710 may also be added to the message to indicate how long the device should wait before trying to contact the SCS. These new IEs may be used for the scenario where the SCS does not need the device to be triggerable, but the MSC accepts the location update.

FIG. 8 shows location updating reject message content 800. The LOCATION_UPDATING_REJECT message may be an existing message sent by the network to the mobile station to indicate that updating or IMSI attach has failed. As shown in FIG. 8, a reject cause IE 805 may be updated so that it may indicate why the SCS initiated the rejection, and an SCS backoff timer IE 810 may be used to indicate how long the device should wait before trying to contact the SCS.

The following messages are GPRS mobility management messages. FIG. 9 shows attach accept message content 900. The ATTACH_ACCEPT message may be an existing message sent by the network to the WTRU to indicate that the corresponding attach request has been accepted. As shown in FIG. 9, an additional network feature support IE 905 may be updated so that it may be used to indicate if the SCS wants the device to attach. An SCS backoff timer IE 910 may be used to indicate how long the device should wait before attempting to connect to the SCS.

FIG. 10 shows attach reject message content 1000. The ATTACH_REJECT message may be an existing messages sent by the network to the WTRU to indicate that the corresponding attach request has been rejected. As shown in FIG. 10, an additional network feature support IE 1005 may be updated so that it may be used to indicate if the SCS wants the device to attach. A SCS backoff timer IE 1010 may be a new information element used to indicate how long the device may wait before attempting to connect to the SCS.

FIG. 11 shows detach request message content 1100. The DETACH_REQUEST (network initiated) message may be an existing message sent by the network to request the release of a GMM context. An SCS backoff timer IE 1105 may be used to indicate how long the device should wait before attempting to connect to the SCS. An additional network feature support IE 1110 may be updated and added to the message so that it may be used by the network to indicate that the SCS desires the device to detach.

The following messages are EPS mobility management (EMM) messages.

FIG. 12 shows attach accept message content 1200. The ATTACH_ACCEPT message may be an existing message sent by the network to the WTRU to indicate that the corresponding attach request has been accepted. An additional update result IE 1205 may be updated so that it may be used by the network to indicate that the attach is being accepted by the network, even though the SCS requested that the attach be rejected. An SCS backoff timer IE 1210 may be a new information element that may be used to indicate how long the WTRU should wait before attempting to attach to the SCS. An EMM cause IE 1215 may be used in the ATTACH_ACCEPT message to indicate to the WTRU that it may take certain actions. Thus, it may not be used to indicate to the WTRU the case where the SCS does not want to be contacted when the network is allowing the attach.

FIG. 13 shows attach reject message content 1300. The ATTACH_REJECT message may be an existing message sent by the network to the WTRU to indicate that the corresponding attach request has been rejected. The SCS backoff cause IE 1305 may be new and may be used to indicate to the WTRU how long it should wait before attempting to communicate with the SCS. The additional update result IE 1310 may be an existing IE which has been added to this message and modified so that it may indicate the reason that the SCS rejected the attach request.

FIG. 14 shows detach request message content 1400. The DETACH_REQUEST (WTRU terminated) message may be an existing message sent by the network to the WTRU to request the release of an EMM context. The additional update result IE 1405 may be an existing IE that may be added to this message and has been updated so that it may be used by the network to indicate why the SCS is detaching the device. The SCS backoff timer IE 1410 may be a new IE in this message used by the WTRU to delay a reattach attempt when the detach type is "re-attach required". When the detach type is not "re-attach required", the WTRU may ignore the SCS backoff timer IE 1410.

CS domain mobility management IEs are described herein.

FIG. 15 shows a reject cause IE. The purpose of the reject cause IE is to indicate the reason why a request from the WTRU is rejected by the network. As shown in FIG. 15, the reject cause IE may be coded and may be a type 3 IE with a 2 octet length. New cause values may be added to support the case where the SCS causes the attachment to be rejected.

FIG. 16 shows an SCS backoff timer IE. The purpose of the new SCS backoff timer IE may be to specify how long the SCS would like the WTRU to wait before contacting it over the data plane. As shown in FIG. 16, the SCS backoff timer IE may be coded and may be a type 3 information element with a 2 octet length.

GMM IEs are described herein.

FIG. 17 shows an additional network support feature IE. This may be an existing IE with a purpose of indicating whether certain features are supported by the network. As shown in FIG. 17, the additional network support feature IE may be coded and may be a type 4 IE with a length of 3 octets. This IE may be updated so that bits 2 and 3 may be used to indicate the SCS cause for not allowing the device to attach at this time.

FIG. 18 shows a GMM cause IE. The purpose of the GMM cause IE may be to indicate the reason why a GMM request from the WTRU is rejected by the network. The GMM cause value may be ignored if the detach type indicates "IMSI detach" or "re-attach required". The GMM cause may not be ignored if the detach type indicates "re-attach not required". As shown in FIG. 18, the GMM cause IE may be coded and modified to reinterpret the fields. Whenever the additional network support feature IE is included in a message with the GMM cause IE, the WTRU may check whether the additional network support feature IE indicates that the SCS is the cause of the message. The GMM cause may be a type 3 IE with a 2 octet length.

EMM IEs are described herein

FIG. 19 shows an EMM cause IE. The purpose of the EMM cause LE may be to indicate the reason why an EMM request from the WTRU is rejected by the network. The EMM cause value may be ignored if the detach type indicates "IMSI detach" or "re-attach required". The EMM cause value may not be ignored if the detach type indicates "re-attach not required". As shown in FIG. 19, the EMM cause IE may be coded and modified to reinterpret the fields IE. Whenever the additional update result IE is included in a message with the EMM cause IE, the WTRU may check if the additional update result IE indicates that the SCS is the cause of the message. The EMM cause may be a type 3 IE with a 2 octet length.

Figure 20:
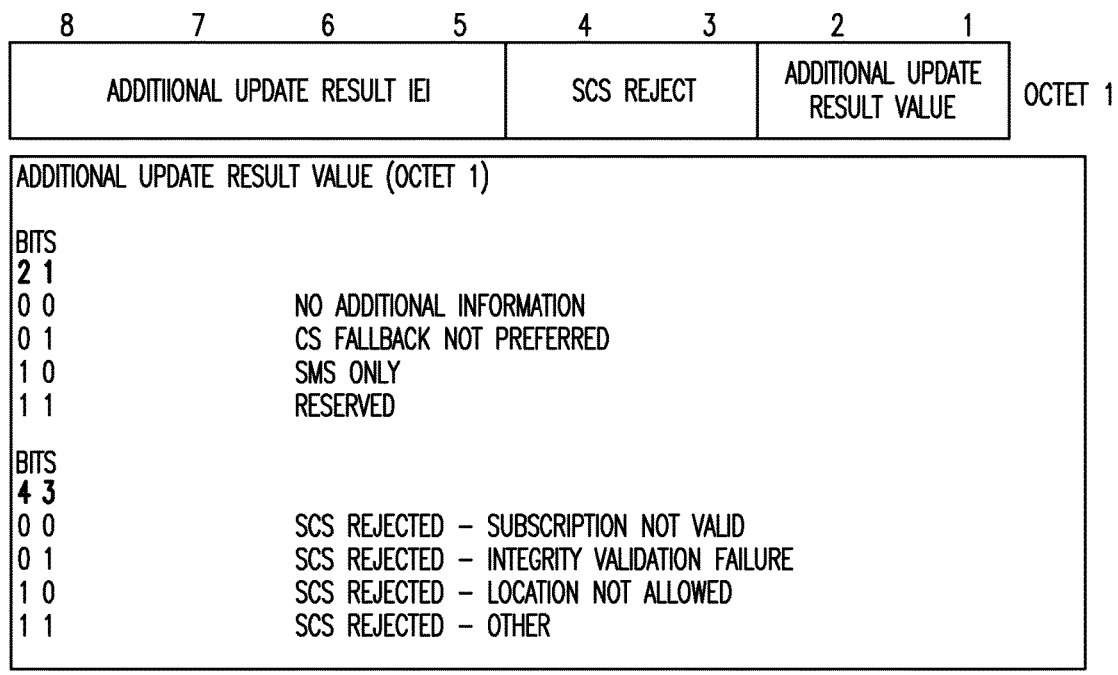
FIG. 20 shows an additional update result IE.

FIG. 20 shows an additional update result IE. The purpose of the additional update result IE may be to provide additional information about the result of a combined attach procedure or a combined tracking area updating procedure. As shown in FIG. 20, the additional update result IE may be coded. The additional update result IE may be a type 1 IE with spare bits 3 and 4. An SCS reject field has been added so that the network may indicate to the WTRU that the attach is being accepted, but the SCS requested that it be rejected.

Figure 21:
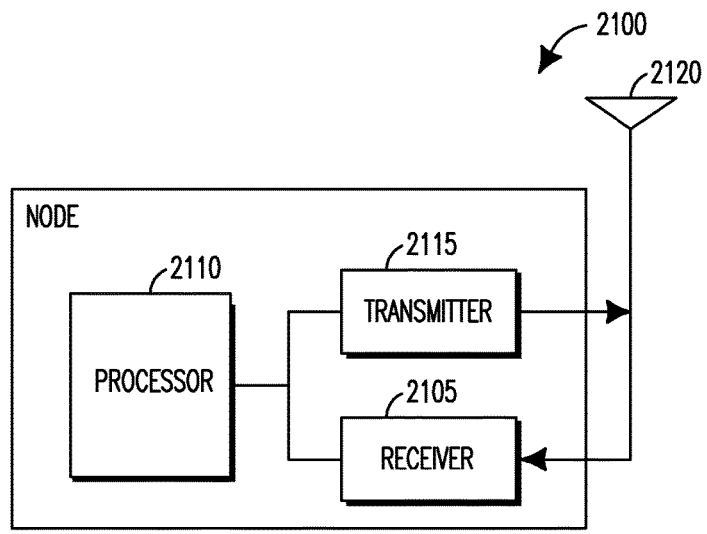
FIG. 21 is a block diagram of a node configured to detach or attach a WTRU from/to a network.

In one embodiment, FIG. 21 is a block diagram of a first node 2100 configured to detach a WTRU from a network. The first node 2100 may include a receiver 2105, a processor 2110, a transmitter 2115 and at least one antenna 2120.

The receiver 2105 may be configured to receive a detach request message from a server initiating the detachment of a WTRU from a network. The transmitter 2115 may be configured to transmit a subscriber information request message to an HSS.

The receiver 2105 may further be configured to receive a subscriber information response message in response to the subscriber information request message. The transmitter 2115 may further be configured to transmit a detach request message to a second node on a condition that the subscriber information response message indicates that the server is authorized to initiate the detachment of the WTRU from the network.

The second node may either be an MME or an SGSN. The first node nay be an MTC-IFW. The detach request message may identify the WTRU and the network. The subscriber information request message may identify at least one of the server, the WTRU and the network. The subscriber information response message may indicate whether or not the server is authorized to initiate the detachment of the WTRU from the network. The subscriber information response message may include an IMSI of the WTRU. The subscriber information response message may include at least one of the address or name of the second node. The detach request message may include a cause and a backoff time.

In another embodiment, FIG. 21 is a block diagram of a first node 2100 configured to attach a WTRU to a network. The first node 2100 may include a receiver 2105, a processor 2110, a transmitter 2115 and at least one antenna 2120. The receiver 2105 may be configured to receive an attachment acknowledgement and subscriber information message from an HSS. The transmitter 2115 may be configured to transmit an attach request message to the server via a second node. The receiver 2105 may be further configured to receive an attach request response message from the server via the second node.

The receiver 2105 may be further configured to receive an attach request message from the WTRU. The attach request response message may indicate whether or not the server authorizes the attachment of the WTRU to the network.

The receiver 2105 may be further configured to receive an initial context setup request/attach accept message. On a condition that the attach request response message indicates that the server does not authorize the attachment of the WTRU to the network, the initial context setup request/attach accept message may indicate a backoff time, determined by the server, indicating when the WTRU may reattempt to attach to the network.

Embodiments

1. A method of detaching a wireless transmit/receive unit (WTRU) from a network, the method comprising:
a first node receiving a detach request message from a server initiating the detachment of the WTRU from the network;
the first node transmitting a subscriber information request message to a home subscriber server (HSS);
the first node receiving a subscriber information response message in response to the subscriber information request message; and
the first node transmitting a detach request message to a second node on a condition that the subscriber information response message indicates that the server is authorized to initiate the detachment of the WTRU from the network.

2. The method of embodiment 1 wherein the second node is either a mobility management entity (MME) or a serving general packet radio service (GPRS) support node (SGSN).

3. The method as in any one of embodiments 1-2 wherein the first node is a machine type communication interworking function.

4. The method as in any one of embodiments 1-3 wherein the detach request message identifies the WTRU.

5. The method as in any one of embodiments 1-4 wherein the subscriber information request message identifies at least one of the server and the WTRU.

6. The method as in any one of embodiments 1-5 wherein the subscriber information response message indicates whether or not the server is authorized to initiate the detachment of the WTRU from the network.

7. The method as in any one of embodiments 1-6 wherein the subscriber information response message includes an international mobile subscriber identity (IMSI) of the WTRU.

8. The method as in any one of embodiments 1-7 wherein the subscriber information response message includes at least one of an address or name of the second node.

9. The method as in any one of embodiments 1-8 wherein the detach request message includes a cause and a backoff time.

10. The method as in any one of embodiments 1-9 further comprising:
the first node receiving a detach response message from the second node upon detachment of the WTRU from the network.

11. A method of attaching a wireless transmit/receive unit (WTRU) to a network, the method comprising:
a first node receiving an attachment acknowledgement and subscriber information message from a home subscriber server (HSS);
the first node transmitting an attach request message to a server via a second node; and
the first node receiving an attach request response message from the server via the second node.

12. The method of embodiment 11 wherein the first node is either a mobility management entity (MME) or a serving general packet radio service (GPRS) support node (SGSN).

13. The method as in any one of embodiments 11-12 wherein the second node is a machine type communication interworking function.

14. The method as in any one of embodiments 11-13 further comprising: the first node receiving an attach request message from the WTRU.

15. The method as in any one of embodiments 11-14 wherein the attach request response message indicates whether or not the server authorizes the attachment of the WTRU to the network.

16. The method of embodiment 15 further comprising:
the first node receiving an initial context setup request/attach accept message, wherein on a condition that the attach request response message indicates that the server does not authorize the attachment of the WTRU to the network, the initial context setup request/attach accept message indicates a backoff time, determined by the server, indicating when the WTRU may reattempt to attach to the network.

17. A first node comprising:
a receiver configured to receive a detach request message from a server initiating the detachment of a wireless transmit/receive unit (WTRU) from a network;
a transmitter configured to transmit a subscriber information request message to a home subscriber server (HSS);
the receiver further configured to receive a subscriber information response message in response to the subscriber information request message; and
the transmitter further configured to transmit a detach request message to a second node on a condition that the subscriber information response message indicates that the server is authorized to initiate the detachment of the WTRU from the network.

18. The first node of embodiment 17 wherein the second node is either a mobility management entity (MME) or a serving general packet radio service (GPRS) support node (SGSN).

19. The first node as in any one of embodiments 17-18 wherein the first node is a machine type communication interworking function.

20. The first node as in any one of embodiments 17-19 wherein the detach request message identifies the WTRU.

21. The first node as in any one of embodiments 17-20 wherein the subscriber information request message identifies at least one of the server and the WTRU.

22. The first node as in any one of embodiments 17-21 wherein the subscriber information response message indicates whether or not the server is authorized to initiate the detachment of the WTRU from the network.

23. The first node as in any one of embodiments 17-22 wherein the subscriber information response message includes an international mobile subscriber identity (IMSI) of the WTRU.

24. The first node as in any one of embodiments 17-23 wherein the subscriber information response message includes at least one of an address or name of the second node.

25. The first node as in any one of embodiments 17-24 wherein the detach request message includes a cause and a backoff time.

Although features and elements are described above in particular combinations, one of ordinary skill in the art will appreciate that each feature or element may be used alone or in combination with any of the other features and elements. In addition, the embodiments described herein may be implemented in a computer program, software, or firmware incorporated in a computer-readable medium for execution by a computer or processor. Examples of computer-readable media include electronic signals, (transmitted over wired or wireless connections), and computer-readable storage media. Examples of computer-readable storage media include, but are not limited to, a read only memory (ROM), a random access memory (RAM), a register, a cache memory, a semiconductor memory device, a magnetic media, (e.g., an internal hard disc or a removable disc), a magneto-optical media, and an optical media such as a compact disc (CD) or a digital versatile disc (DVD). A processor in association with software may be used to implement a radio frequency transceiver for use in a WTRU, UE, terminal, base station, Node-B, eNB, HNB, HeNB, AP, RNC, wireless router or any host computer.

What is claimed:

1. A method of attaching a wireless transmit/receive unit (WTRU) to a network, the method comprising:
    receiving, by a mobility management entity (MME), an initial attach request message from a WTRU;
    receiving, by the MME, a subscriber information message, wherein the subscriber information message includes an address of an interworking function (IWF) network node;
    in response to receipt of the subscriber information message, sending, by the MME, a WTRU connection request message to the IWF network node using the address of the IWF network node, wherein the WTRU connection request message is different than the initial attach request message, wherein the WTRU connection request message is sent on a condition that a back-off timer for the WTRU has expired; and
    receiving, by the MME, a response message from the IWF network node, wherein the response message indicates whether a connection of the WTRU connection request message was authorized.

2. The method of claim 1, wherein the connection between the WTRU and the network is established when the connection was authorized.

3. The method of claim 1, wherein the authorized connection indicates that a server indicated to the IWF network node that the WTRU should be allowed to perform an action.

4. A mobility management entity (MME) comprising:
    a receiver operatively coupled to a processor, the receiver and processor configured to receive an initial request message from a wireless transmit/receive unit (WTRU), and receive a subscriber information message, wherein the subscriber information message includes an address of an interworking function (IWF) network node;
    a transmitter operatively coupled to the processor, the transmitter and processor configured to, in response to receipt of the subscriber information message, send a WTRU connection request message to the IWF network node based on the address of the IFW network node, wherein the WTRU connection request message is sent on a condition that a back-off timer for the WTRU has expired, wherein the WTRU connection request message is different than the initial attach request message; and
    the receiver further configured to receive a response message from the IWF network node, wherein the response message indicates whether a connection of the WTRU connection request message was authorized.

5. The first node of claim 4, wherein the connection between the WTRU and the network is established when the connection was authorized.

6. The MME of claim 4, wherein the authorized connection indicates that a server indicated to the IWF network node that the WTRU should be allowed to perform an action.

7. A method performed by a mobility management entity (MME) the method comprising:
    receiving an initial attach request message from a wireless transmit/receive unit (WTRU);
    receiving a subscriber information message, wherein the subscriber information message includes an address of an interworking function (IWF) network node;
    sending a WTRU connection request message to the IWF network node using the address of the IWF network node in response to receiving the subscriber information message, wherein the WTRU connection request message is sent on a condition that a back-off timer for the WTRU has expired, wherein the WTRU connection request message is different than the initial attach request message; and
    receiving a response message from the IWF network node indicating whether a connection of the WTRU connection request message was authorized, wherein an authorized connection indicates that a server indicated to the IWF network node that there WTRU should be allowed to perform an action.

* * * * *